(12) United States Patent
Butt et al.

(10) Patent No.: US 10,691,376 B2
(45) Date of Patent: Jun. 23, 2020

(54) PRIORITIZED SOURCING FOR EFFICIENT REWRITING

(71) Applicant: International Business Machines Corporation, Armonk, NY (US)

(72) Inventors: Kevin D. Butt, Tucson, AZ (US); Roy D. Cideciyan, Rueschlikon (CH); Simeon Furrer, Altdorf (CH); Mark A. Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 16/116,792

(22) Filed: Aug. 29, 2018

(65) Prior Publication Data

US 2020/0073587 A1 Mar. 5, 2020

(51) Int. Cl.
*G06F 12/00* (2006.01)
*G06F 3/06* (2006.01)
*G06F 12/06* (2006.01)
*G11B 5/008* (2006.01)

(52) U.S. Cl.
CPC .......... *G06F 3/0659* (2013.01); *G06F 3/0604* (2013.01); *G06F 3/0674* (2013.01); *G06F 12/0607* (2013.01); *G11B 5/00813* (2013.01); *G06F 2212/1016* (2013.01)

(58) Field of Classification Search
CPC . G06F 3/0619; G06F 12/0638; G06F 20/1833
See application file for complete search history.

(56) References Cited

U.S. PATENT DOCUMENTS

| | | | |
|---|---|---|---|
| 7,876,516 B2 | 1/2011 | Cideciyan et al. | |
| 8,196,019 B2 | 6/2012 | Cideciyan et al. | |
| 8,259,405 B2 | 9/2012 | Cideciyan et al. | |
| 8,276,045 B2 | 9/2012 | Cideciyan et al. | |
| 8,495,470 B2 | 7/2013 | Cideciyan et al. | |
| 8,898,369 B1* | 11/2014 | Yang | G06F 12/0638 711/102 |
| 8,910,012 B2 | 12/2014 | Blaum et al. | |
| 9,401,176 B2 | 7/2016 | Cideciyan et al. | |
| 9,548,760 B2 | 1/2017 | Cideciyan et al. | |
| 9,601,160 B2 | 3/2017 | Bentley et al. | |
| 2012/0036318 A1* | 2/2012 | Cideciyan | G06F 3/0619 711/111 |
| 2015/0085393 A1* | 3/2015 | Cideciyan | G11B 20/10009 360/40 |
| 2015/0113216 A1* | 4/2015 | Butt | G06F 3/0611 711/111 |
| 2016/0292034 A1* | 10/2016 | Cideciyan | G11B 20/1833 |

OTHER PUBLICATIONS

Mense et al., "An Erasure-Resilient Encoding System for Flexible Reading and Writing in Storage Networks," ACM Transactions on Autonomous and Adaptive Systems, vol. 7, No. 2, Article 22, Jul. 2012, pp. 22:1-22:16.

* cited by examiner

*Primary Examiner* — Ryan Bertram
*Assistant Examiner* — Trang K Ta
(74) *Attorney, Agent, or Firm* — Zilka-Kotab, P.C.

(57) ABSTRACT

A computer-implemented method according to one embodiment includes identifying code word interleaved (CWI)-4 entries to be re-written to a data storage cartridge, selecting a subset of the CWI-4 entries to be included within a first CWI-4 set, where a plurality of the CWI-4 entries within the subset are associated with a single sub data set (SDS), and re-writing the first CWI-4 set to the data storage cartridge.

19 Claims, 24 Drawing Sheets

| CWl-4 SET NUMBER | TRACK NUMBER | | | |
|---|---|---|---|---|
| | 0 | 1 | ... | 31 |
| 0 | A = {6, 7, 22, 23, 38, 39, 54, 55} | A = {8, 9, 24, 25, 40, 41, 56, 57} | ... | A = {4, 5, 20, 21, 36, 37, 52, 53} |
| 1 | A = {14, 15, 30, 31, 46, 47, 62, 63} | A = {0, 1, 16, 17, 32, 33, 48, 49} | ... | A = {12, 13, 28, 29, 44, 45, 60, 61} |
| 2 | A = {6, 7, 22, 23, 38, 39, 54, 55} | A = {8, 9, 24, 25, 40, 41, 56, 57} | ... | A = {4, 5, 20, 21, 36, 37, 52, 53} |
| 3 | A = {14, 15, 30, 31, 46, 47, 62, 63} | A = {0, 1, 16, 17, 32, 33, 48, 49} | ... | A = {12, 13, 28, 29, 44, 45, 60, 61} |
| 4 | A = {6, 7, 22, 23, 38, 39, 54, 55} | A = {8, 9, 24, 25, 40, 41, 56, 57} | ... | A = {4, 5, 20, 21, 36, 37, 52, 53} |
| 5 | A = {14, 15, 30, 31, 46, 47, 62, 63} | A = {0, 1, 16, 17, 32, 33, 48, 49} | ... | A = {12, 13, 28, 29, 44, 45, 60, 61} |
| 6 | A = {6, 7, 22, 23, 38, 39, 54, 55} | A = {8, 9, 24, 25, 40, 41, 56, 57} | ... | A = {4, 5, 20, 21, 36, 37, 52, 53} |
| 7 | A = {14, 15, 30, 31, 46, 47, 62, 63} | A = {0, 1, 16, 17, 32, 33, 48, 49} | ... | A = {12, 13, 28, 29, 44, 45, 60, 61} |
| 8 | A = {6, 7, 22, 23, 38, 39, 54, 55} | A = {8, 9, 24, 25, 40, 41, 56, 57} | ... | A = {4, 5, 20, 21, 36, 37, 52, 53} |
| 9 | A = {14, 15, 30, 31, 46, 47, 62, 63} | A = {0, 1, 16, 17, 32, 33, 48, 49} | ... | A = {12, 13, 28, 29, 44, 45, 60, 61} |

| CWI-A SET NUMBER | TRACK NUMBER | | | |
|---|---|---|---|---|
| | 0 | 1 | ... | 31 |
| 0 | A = {18, 19, 50, 51}<br>B = {20, 21, 52, 53} | A = {20, 21, 52, 53}<br>B = {22, 23, 54, 55} | ... | A = {16, 17, 48, 49}<br>B = {18, 19, 50, 51} |
| 1 | A = {6, 7, 38, 39}<br>B = {8, 9, 40, 41} | A = {8, 9, 40, 41}<br>B = {10, 11, 42, 43} | ... | A = {4, 5, 36, 37}<br>B = {6, 7, 38, 39} |
| 2 | A = {26, 27, 58, 59}<br>B = {28, 29, 60, 61} | A = {28, 29, 60, 61}<br>B = {30, 31, 62, 63} | ... | A = {24, 25, 56, 57}<br>B = {26, 27, 58, 59} |
| 3 | A = {14, 15, 46, 47}<br>B = {16, 17, 48, 49} | A = {16, 17, 48, 49}<br>B = {18, 19, 50, 51} | ... | A = {12, 13, 44, 45}<br>B = {14, 15, 46, 47} |

| CWI-4 SET NUMBER | TRACK NUMBER | | | | |
|---|---|---|---|---|---|
| | 0 (1004A) | 1 (1004B) | ... | 31 (1004N) | |
| 0 (1002A) | A = {6, 7, 22, 23, 38, 39, 54, 55}<br>B = {4, 5, 20, 21, 36, 37, 52, 53} | A = {8, 9, 24, 25, 40, 41, 56, 57}<br>B = {6, 7, 22, 23, 38, 39, 54, 55} | ... | A = {4, 5, 20, 21, 36, 37, 52, 53}<br>B = {2, 3, 18, 19, 34, 35, 50, 51} | |
| 1 (1002B) | A = {14, 15, 30, 31, 46, 47, 62, 63}<br>B = {12, 13, 28, 29, 44, 45, 60, 61} | A = {0, 1, 16, 17, 32, 33, 48, 49}<br>B = {14, 15, 30, 31, 46, 47, 62, 63} | ... | A = {12, 13, 28, 29, 44, 45, 60, 61}<br>B = {10, 11, 26, 27, 42, 43, 58, 59} | |
| 2 | A = {6, 7, 22, 23, 38, 39, 54, 55}<br>B = {4, 5, 20, 21, 36, 37, 52, 53} | A = {8, 9, 24, 25, 40, 41, 56, 57}<br>B = {6, 7, 22, 23, 38, 39, 54, 55} | ... | A = {4, 5, 20, 21, 36, 37, 52, 53}<br>B = {2, 3, 18, 19, 34, 35, 50, 51} | |
| 3 (1002N) | A = {14, 15, 30, 31, 46, 47, 62, 63}<br>B = {12, 13, 28, 29, 44, 45, 60, 61} (1006A) | A = {0, 1, 16, 17, 32, 33, 48, 49}<br>B = {14, 15, 30, 31, 46, 47, 62, 63} | ... | A = {12, 13, 28, 29, 44, 45, 60, 61}<br>B = {10, 11, 26, 27, 42, 43, 58, 59} | |

| CWI-4 SET NUMBER | TRACK NUMBER | | ... | |
|---|---|---|---|---|
| | 0 | 1 | | 31 |
| 0 | A = {18, 19, 50, 51}<br>B = {20, 21, 48, 49} | A = {20, 21, 52, 53}<br>B = {22, 23, 50, 51} | | A = {16, 17, 48, 49}<br>B = {18, 19, 46, 47} |
| 1 | A = {6, 7, 38, 39}<br>B = {8, 9, 36, 37} | A = {8, 9, 40, 41}<br>B = {10, 11, 38, 39} | | A = {4, 5, 36, 37}<br>B = {6, 7, 34, 35} |
| 2 | A = {26, 27, 58, 59}<br>B = {28, 29, 56, 57} | A = {28, 29, 60, 61}<br>B = {30, 31, 58, 59} | | A = {24, 25, 56, 57}<br>B = {26, 27, 54, 55} |
| 3 | A = {14, 15, 46, 47}<br>B = {16, 17, 44, 45} | A = {16, 17, 48, 49}<br>B = {18, 19, 46, 47} | | A = {12, 13, 44, 45}<br>B = {14, 15, 42, 43} |

FIG. 11

| CWl-4 SET NUMBER | TRACK NUMBER | | ... | |
|---|---|---|---|---|
| | 0 (1204A) | 1 (1204B) | ... | 31 (1204N) |
| 0 (1202A) | A = {6, 7, 22, 23, 38, 39, 54, 55}<br>B = {4, 5, 20, 21, 40, 41, 56, 57} | A = {8, 9, 24, 25, 40, 41, 56, 57}<br>B = {6, 7, 22, 23, 42, 43, 58, 59} | ... | A = {4, 5, 20, 21, 36, 37, 52, 53}<br>B = {2, 3, 18, 19, 38, 39, 54, 55} |
| 1 (1202B) | A = {14, 15, 30, 31, 46, 47, 62, 63}<br>B = {12, 13, 28, 29, 32, 33, 48, 49} | A = {0, 1, 16, 17, 32, 33, 48, 49}<br>B = {14, 15, 30, 31, 34, 35, 50, 51} | ... | A = {12, 13, 28, 29, 44, 45, 60, 61}<br>B = {10, 11, 26, 27, 46, 47, 62, 63} |
| 2 | A = {6, 7, 22, 23, 38, 39, 54, 55}<br>B = {4, 5, 20, 21, 40, 41, 56, 57} (1206A) | A = {8, 9, 24, 25, 40, 41, 56, 57}<br>B = {6, 7, 22, 23, 42, 43, 58, 59} (1206B) | ... | A = {4, 5, 20, 21, 36, 37, 52, 53}<br>B = {2, 3, 18, 19, 38, 39, 54, 55} |
| 3 (1202N) | A = {14, 15, 30, 31, 46, 47, 62, 63}<br>B = {12, 13, 28, 29, 32, 33, 48, 49} | A = {0, 1, 16, 17, 32, 33, 48, 49}<br>B = {14, 15, 30, 31, 34, 35, 50, 51} | ... | A = {12, 13, 28, 29, 44, 45, 60, 61}<br>B = {10, 11, 26, 27, 46, 47, 62, 63} |

PRIORITIZED SOURCING FOR EFFICIENT REWRITING

BACKGROUND

The present invention relates to data storage systems, and more specifically, this invention relates to performing a re-write of data to a data storage cartridge.

Data storage cartridges are used for providing cost effective storage and retrieval of large quantities of data. Data storage cartridges are commonly termed "removable media." Data storage cartridge media may comprise any type of media on which data may be stored and which may serve as removable media, including but not limited to magnetic media (such as magnetic tape or disks). An example of a data storage cartridge that is widely employed in automated data storage libraries for mass data storage is a magnetic tape cartridge.

After data is written to a data storage cartridge by a data storage drive, it is reviewed (e.g., as part of a read-while-write operation). If a portion of the data that is written contains more than a predetermined amount of errors, the portion is scheduled to be re-written to the data storage cartridge. However, current methods for implementing this re-writing are inefficient.

SUMMARY

A computer-implemented method according to one embodiment includes identifying code word interleaved (CWI)-4 entries to be re-written to a data storage cartridge, selecting a subset of the CWI-4 entries to be included within a first CWI-4 set, where a plurality of the CWI-4 entries within the subset are associated with a single sub data set (SDS), and re-writing the first CWI-4 set to the data storage cartridge.

According to another embodiment, a computer program product for implementing prioritized sourcing for efficient rewriting includes a computer readable storage medium that has program instructions embodied therewith, where the computer readable storage medium is not a transitory signal per se, and where the program instructions are executable by a processor to cause the processor to perform a method comprising identifying code word interleaved (CWI)-4 entries to be re-written to a data storage cartridge, utilizing the processor, selecting a subset of the CWI-4 entries to be included within a first CWI-4 set, utilizing the processor, where a plurality of the CWI-4 entries within the subset are associated with a single sub data set (SDS), and re-writing the first CWI-4 set to the data storage cartridge, utilizing the processor.

A system according to another embodiment includes a processor, and logic integrated with the processor, executable by the processor, or integrated with and executable by the processor, where the logic is configured to identify code word interleaved (CWI)-4 entries to be re-written to a data storage cartridge, select a subset of the CWI-4 entries to be included within a first CWI-4 set, where a plurality of the CWI-4 entries within the subset are associated with a single sub data set (SDS), and re-write the first CWI-4 set to the data storage cartridge.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 8 illustrates an exemplary rewrite table where G=8 (m=4), M=32, and S=64, in accordance with one embodiment.

FIG. 9 illustrates an exemplary rewrite table with prioritized sourcing where G=4 (m=2), M=32, and S=64, in accordance with one embodiment.

FIG. 10 illustrates an exemplary rewrite table with prioritized sourcing where G=8 (m=4), M=32, and S=64, in accordance with one embodiment.

FIG. 11 illustrates an exemplary rewrite table with staggered prioritized sourcing where G=4 (m=2), M=32, and S=64, in accordance with one embodiment.

FIG. 12 illustrates an exemplary rewrite table with staggered prioritized sourcing where G=8 (m=4), M=32, and S=64, in accordance with one embodiment.

DETAILED DESCRIPTION

Figure 1:
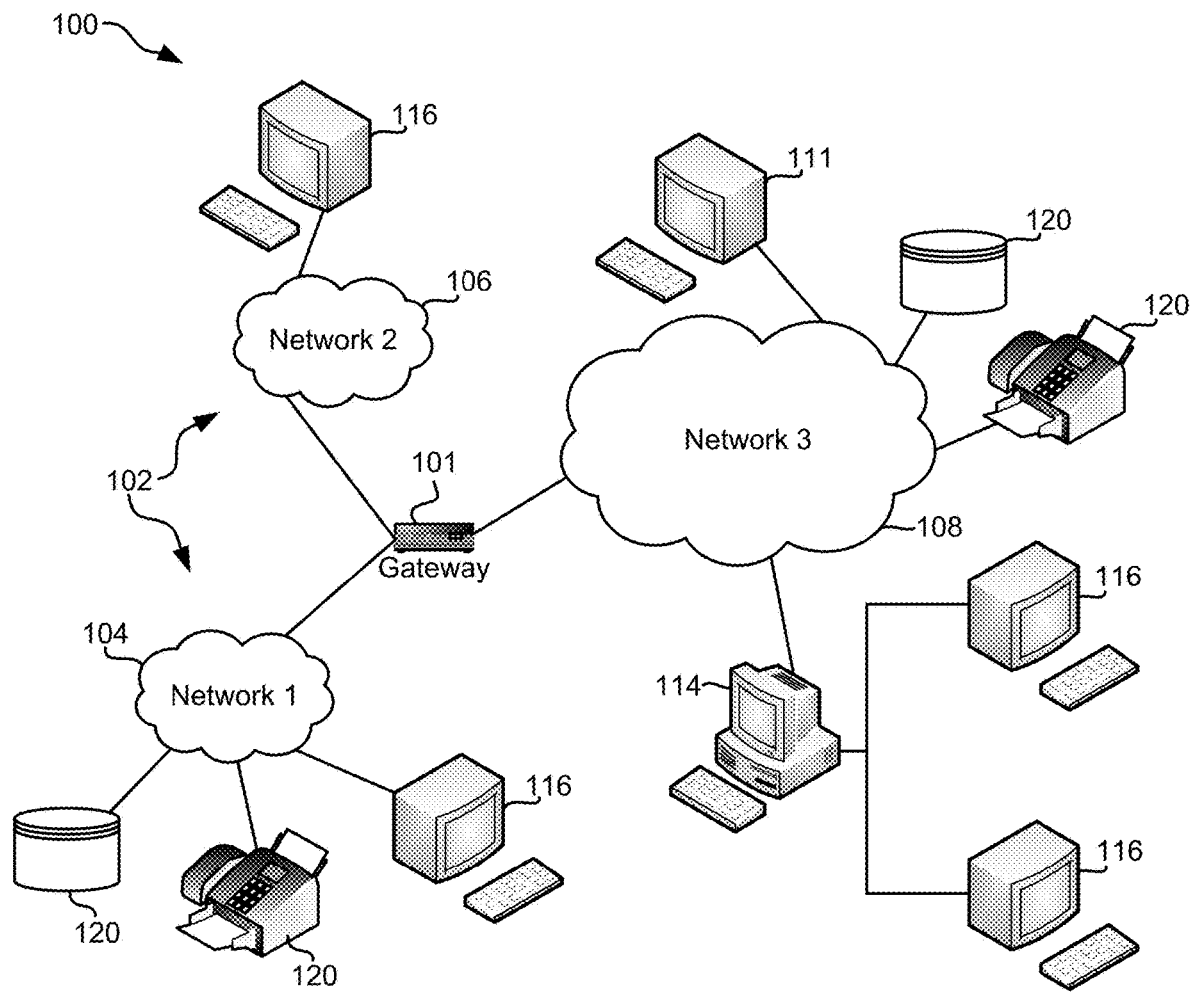
FIG. 1 illustrates a network architecture, in accordance with one embodiment.

The following description discloses several preferred embodiments of systems, methods and computer program products for implementing prioritized sourcing for efficient rewriting. Various embodiments provide a method for adjusting a re-write table such that a plurality of CWI-4 entries within a CWI-4 set are associated with a single sub data set (SDS).

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for implementing prioritized sourcing for efficient rewriting.

In one general embodiment, a computer-implemented method includes identifying code word interleaved (CWI)-4 entries to be re-written to a data storage cartridge, selecting a subset of the CWI-4 entries to be included within a first CWI-4 set, where a plurality of the CWI-4 entries within the subset are associated with a single sub data set (SDS), and re-writing the first CWI-4 set to the data storage cartridge.

In another general embodiment, a computer program product for implementing prioritized sourcing for efficient rewriting includes a computer readable storage medium that has program instructions embodied therewith, where the computer readable storage medium is not a transitory signal per se, and where the program instructions are executable by a processor to cause the processor to perform a method comprising identifying code word interleaved (CWI)-4 entries to be re-written to a data storage cartridge, utilizing the processor, selecting a subset of the CWI-4 entries to be included within a first CWI-4 set, utilizing the processor, where a plurality of the CWI-4 entries within the subset are associated with a single sub data set (SDS), and re-writing the first CWI-4 set to the data storage cartridge, utilizing the processor.

In another general embodiment, a system includes a processor, and logic integrated with the processor, executable by the processor, or integrated with and executable by the processor, where the logic is configured to identify code word interleaved (CWI)-4 entries to be re-written to a data storage cartridge, select a subset of the CWI-4 entries to be included within a first CWI-4 set, where a plurality of the CWI-4 entries within the subset are associated with a single sub data set (SDS), and re-write the first CWI-4 set to the data storage cartridge.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
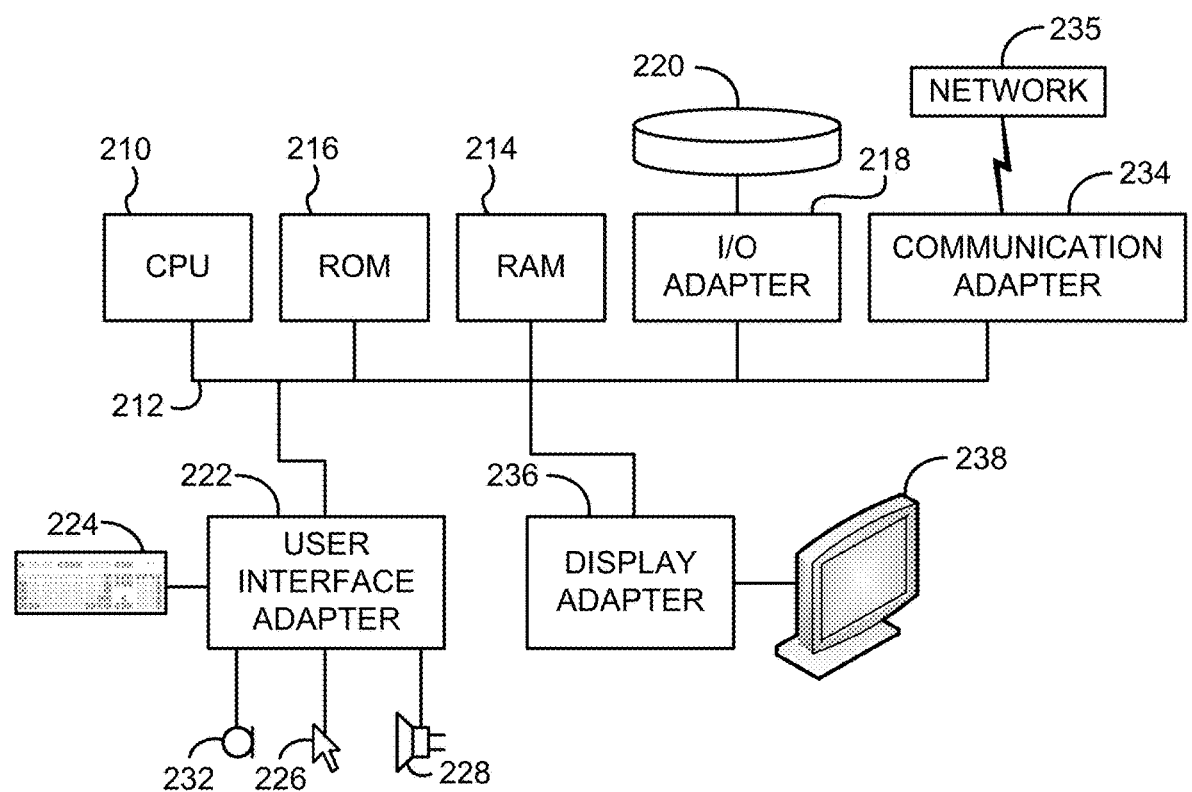
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3A:
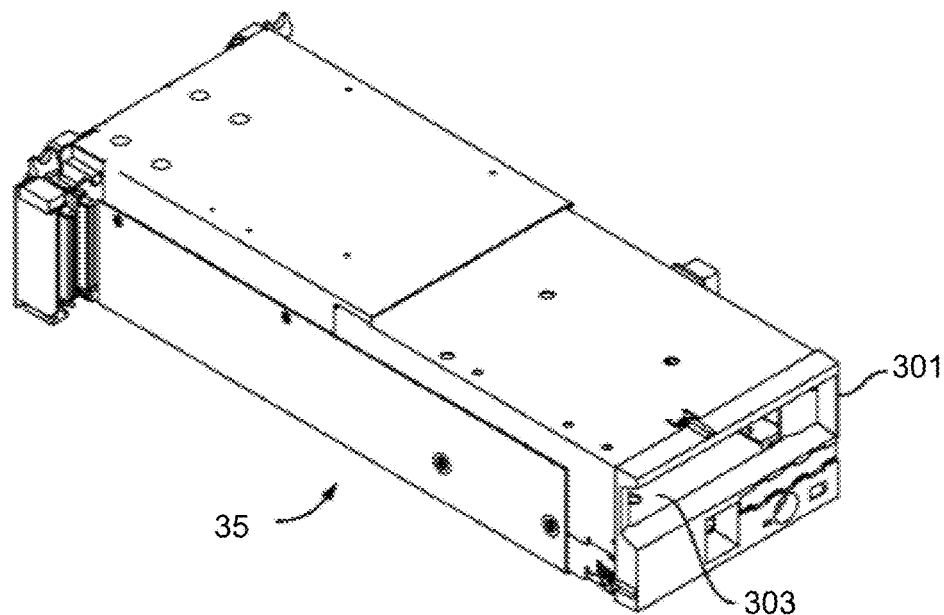
FIG. 3A is a front perspective view of a data storage drive according to one embodiment.
Figure 3B:
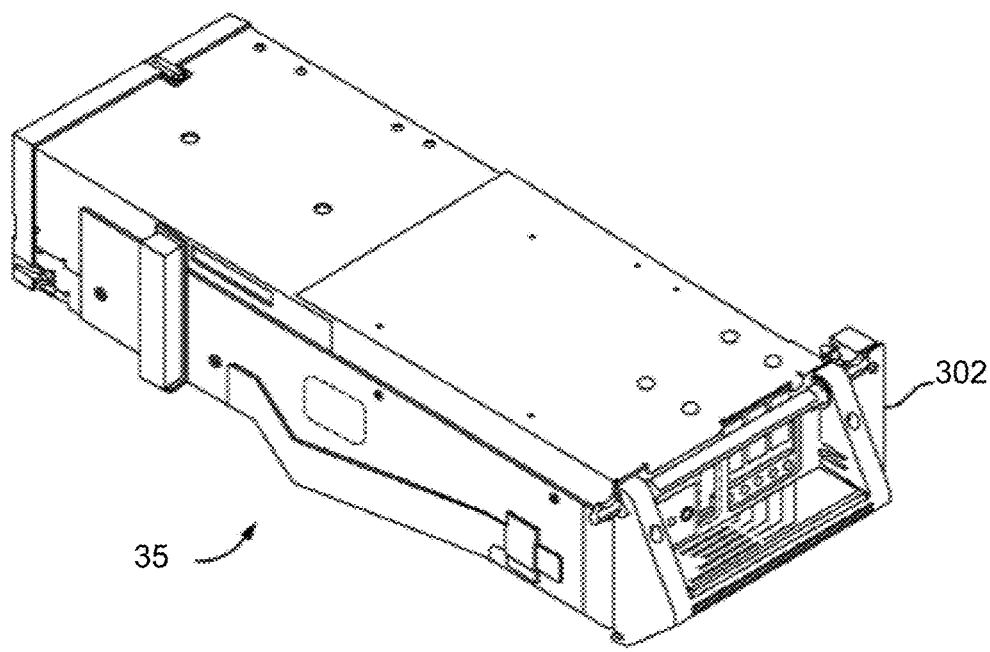
FIG. 3B is a rear perspective view of the data storage drive of FIG. 3A.

FIGS. 3A-3B illustrate the front 301 and rear 302 views of a data storage drive 35, according to one embodiment. In the example depicted in FIGS. 3A-3B, the data storage drive 35 comprises a hot-swap drive canister, which is in no way intended to limit the invention. In fact, any configuration of data storage drive may be used whether or not it includes a hot-swap canister. As discussed above, a data storage drive 35 is used to read and/or write data with respect to the data storage media, and may additionally communicate with a memory which is separate from the media, and is located within the cartridge. Thus, according to one approach, a data storage cartridge may be placed into the data storage drive 35 at opening 303.

Figure 4:
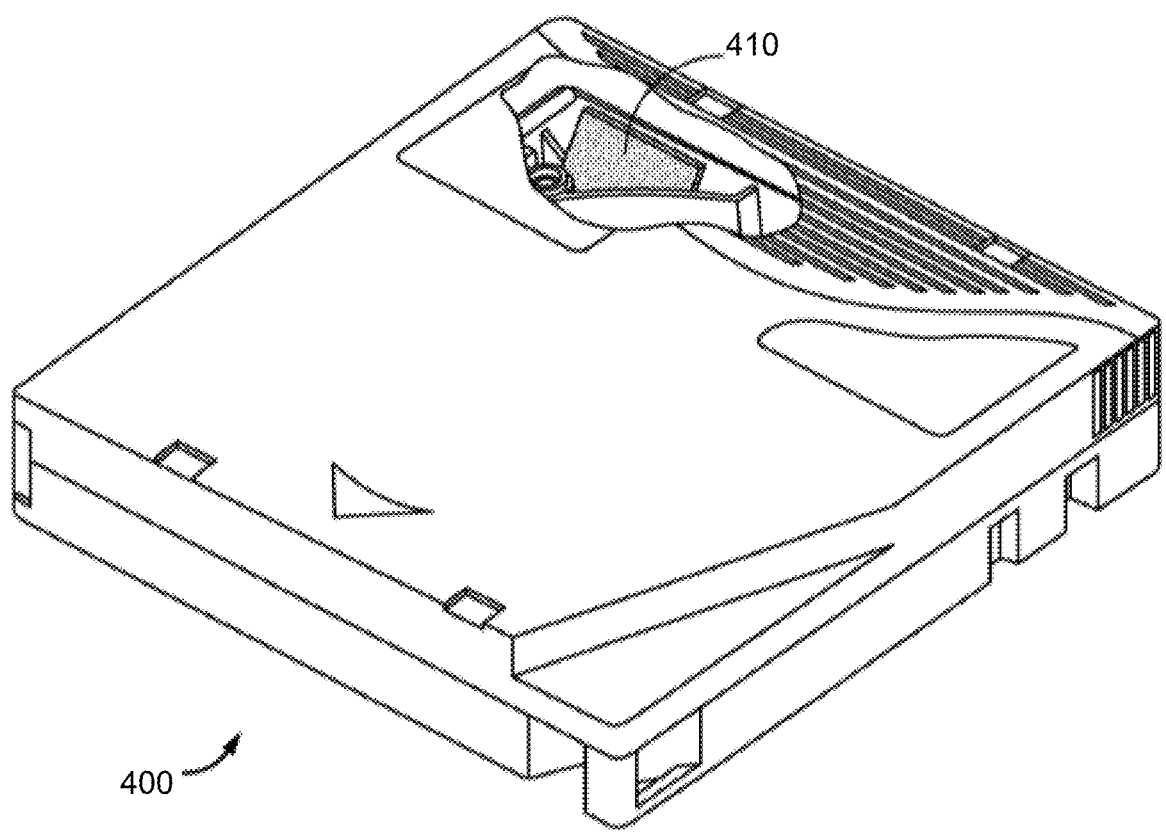
FIG. 4 is perspective view of a data storage cartridge having a cutaway portion, according to one embodiment.

Furthermore, FIG. 4 illustrates an embodiment of a data storage cartridge 400 with a cartridge memory 410 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, discs, etc.; electronic media, e.g., PROM, EEPROM, flash PROM, CompactFlash™, Smartmedia™, Memory Stick™, etc.; etc., or other suitable media. Moreover, an example of a data storage cartridge that is widely employed in automated data storage libraries for mass data storage is a magnetic tape cartridge in which the media is magnetic tape.

Figure 5:
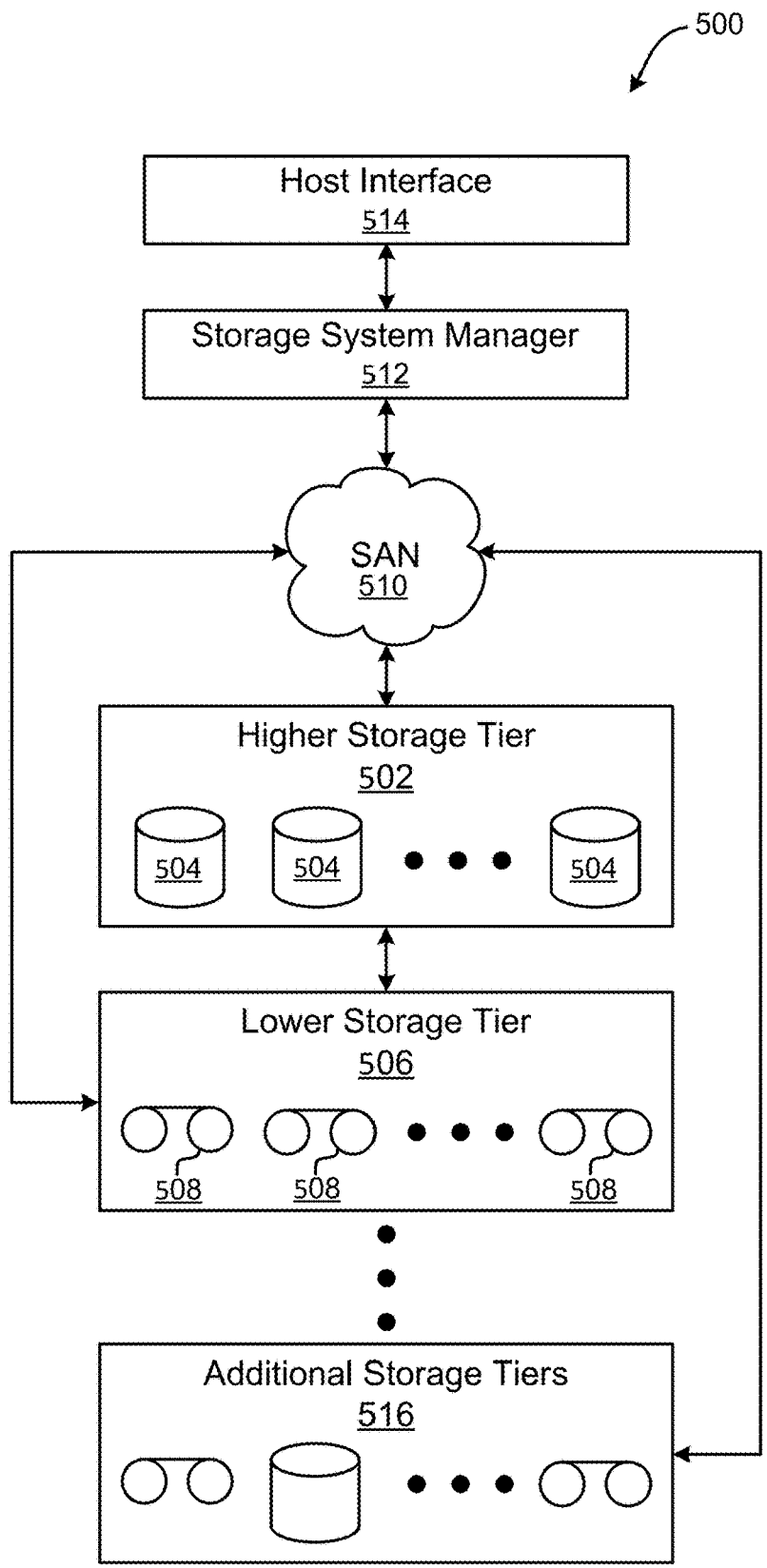
FIG. 5 illustrates a tiered data storage system in accordance with one embodiment.

Now referring to FIG. 5, a storage system 500 is shown according to one embodiment. Note that some of the elements shown in FIG. 5 may be implemented as hardware and/or software, according to various embodiments. The storage system 500 may include a storage system manager 512 for communicating with a plurality of media on at least one higher storage tier 502 and at least one lower storage tier 506. The higher storage tier(s) 502 preferably may include one or more random access and/or direct access media 504, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 506 may preferably include one or more lower performing storage media 508, including sequential access media such as magnetic tape in tape drives and/or optical media, slower accessing HDDs, slower accessing SSDs, etc., and/or others noted herein or known in the art. One or more additional storage tiers 516 may include any combination of storage memory media as desired by a designer of the system 500. Also, any of the higher storage tiers 502 and/or the lower storage tiers 506 may include some combination of storage devices and/or storage media.

The storage system manager 512 may communicate with the storage media 504, 508 on the higher storage tier(s) 502 and lower storage tier(s) 506 through a network 510, such as a storage area network (SAN), as shown in FIG. 5, or some other suitable network type. The storage system manager 512 may also communicate with one or more host systems (not shown) through a host interface 514, which may or may not be a part of the storage system manager 512. The storage system manager 512 and/or any other component of the storage system 500 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 500 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 502, may include a majority of SSD storage media for storing data in a higher performing storage environment, and remaining storage tiers, including lower storage tier 506 and additional storage tiers 516 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 502, while data not having one of these attributes may be stored to the additional storage tiers 516, including lower storage tier 506. Of course, one of skill in the art, upon reading the present descriptions, may devise many other combinations of storage media types to implement into different storage schemes, according to the embodiments presented herein.

According to some embodiments, the storage system (such as 500) may include logic configured to receive a request to open a data set, logic configured to determine if the requested data set is stored to a lower storage tier 506 of a tiered data storage system 500 in multiple associated portions, logic configured to move each associated portion of the requested data set to a higher storage tier 502 of the tiered data storage system 500, and logic configured to assemble the requested data set on the higher storage tier 502 of the tiered data storage system 500 from the associated portions. Of course, this logic may be implemented as a method on any device and/or system or as a computer program product, according to various embodiments.

Figure 6:
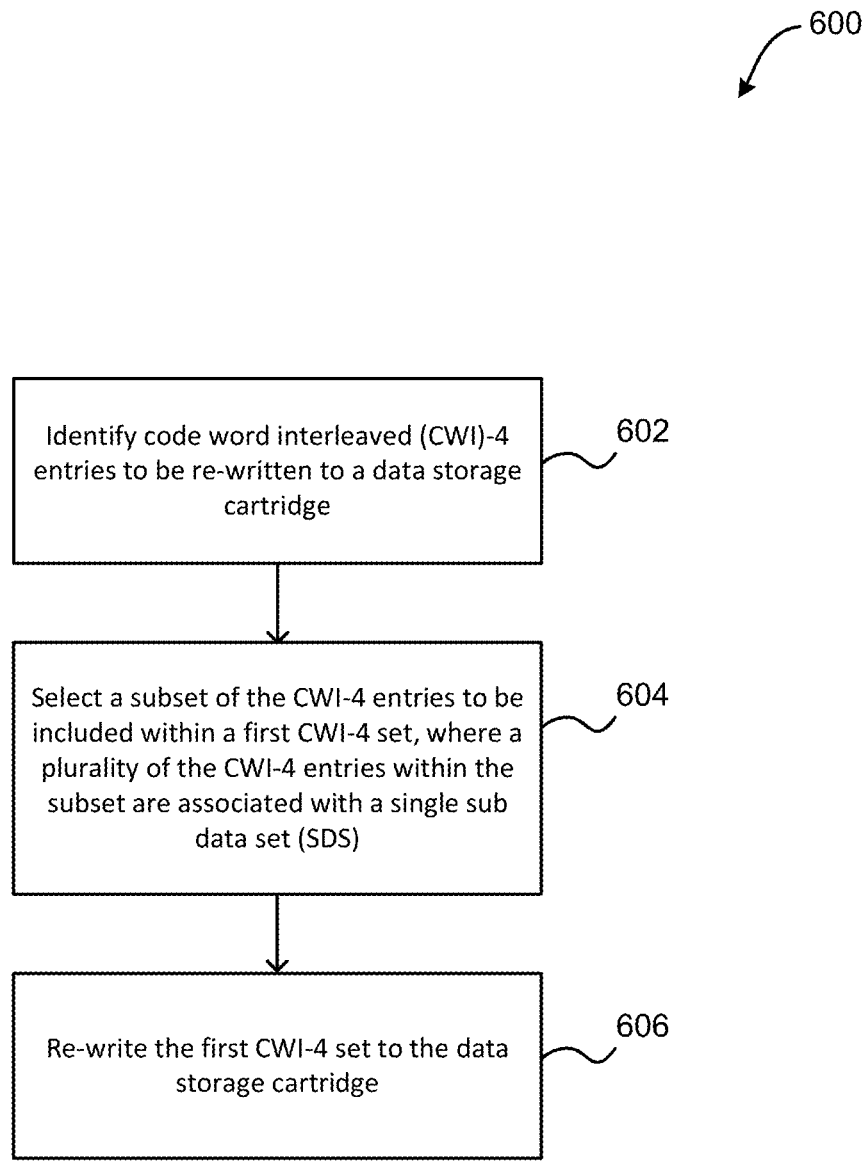
FIG. 6 illustrates a flowchart of a method for implementing prioritized sourcing for efficient rewriting, in accordance with one embodiment.

Now referring to FIG. 6, a flowchart of a method 600 is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where code word interleaved (CWI)-4 entries to be re-written to a data storage cartridge are identified. In one embodiment, each CWI-4 entry may be created from data to be stored (e.g., host data). For example, cyclic redundancy check (CRC) bytes may be added to host data, and the data may be compressed, encrypted, and encoded to create a CWI-4 entry. In another embodiment, each CWI-4 entry may include four C1 codewords, byte interleaved.

Additionally, in one embodiment, each CWI-4 entry may be associated with a predetermined sub data set (SDS). For example, each CWI-4 entry may be created utilizing data from a single SDS of a plurality of different SDSs. In another embodiment, the CWI-4 entries may be written to the data storage cartridge by a data storage drive as part of a standard write operation. In yet another embodiment, the data storage drive may have a write head with a predetermined number of write elements (e.g., 32 elements, etc.).

Further, in one embodiment, the predetermined number of write elements may dictate a number of CWI-4 entries that are simultaneously written to a data storage cartridge. For example, if the data storage drive write head has 32 elements, then 32 CWI-4s may be simultaneously written to the data storage cartridge. In another example, a CWI-4 set may indicate the number of CWI-4 entries that are simultaneously written to a data storage cartridge. In another embodiment, the predetermined number of write elements may match a predetermined number of tracks within the data storage cartridge. For example, if the data storage drive write head has 32 elements, then a CWI-4 element may be written to each of 32 tracks of the data storage cartridge simultaneously.

Further still, in one embodiment, the data storage drive may also have a read head located behind the write head with a predetermined number of read elements that equals the predetermined number of write elements (e.g., 32 elements, etc.). For example, the read head may read the written CWI-4 entries on the data storage cartridge immediately after they are written (e.g., as part of a read while write operation, etc.).

Also, in one embodiment, the data storage drive may determine that one or more CWI-4 entries to be re-written, using the read head. For example, the data storage drive may determine if any errors exist for each CWI-4 entry that is written to the data storage cartridge. In another example, the data storage drive may determine, for each written CWI-4 entry, a number of errors that exist within the four C1 codewords included within the written CWI-4 entry. If the number of errors exceeds a predetermined threshold, the written CWI-4 entry may be selected for re-writing.

In addition, in one embodiment, the data storage drive may store the CWI-4 entries determined to be re-written at a predetermined location within the data storage drive. For example, the CWI-4 entries determined to be re-written may be added to one or more re-write buckets. Each re-write bucket may include a queue for storing CWI-4 entry data. In another example, the re-write bucket to which the CWI-4 entry is added may be associated with a specific sub data set (SDS).

Furthermore, in one embodiment, the CWI-4 entries may be selected from the predetermined location (e.g., the one or more re-write buckets, etc.) to be re-written. For example, the CWI-4 entries may be removed from a queue in a first in, first out (FIFO) manner.

Further still, method 600 may proceed with operation 604, where a subset of the CWI-4 entries are selected to be included within a first CWI-4 set, where a plurality of the CWI-4 entries within the subset are associated with a single sub data set (SDS). In one embodiment, a CWI-4 set may include a plurality of CWI-4 entries that are simultaneously written to a data storage cartridge by the data storage drive (e.g., utilizing the write head of the data storage drive).

Also, in one embodiment, a CWI-4 set may include a plurality of locations that correspond to a plurality of tracks of a data storage cartridge. For example, if a data storage cartridge includes 32 tracks, a CWI-4 set may include 32 locations—one location for each track. In another example, each location within the CWI-4 set may store a single CWI-4 entry.

Additionally, in one embodiment, each CWI-4 entry may be selected from an associated SDS. For example, each SDS may have an associated queue that stores CWI-4 entries that were created utilizing data from that SDS, and that have been determined to be re-written. In another embodiment, CWI-4 entries are included within the CWI-4 set according to a predetermined re-write table. For example, each CWI-4 entry within the CWI-4 set may have associated SDS location limitations. In another example, each CWI-4 entry within the CWI-4 set may be selected from a predetermined subset of available SDSs. In yet another example, for each location within the CWI-4 set, the predetermined subset of SDSs from which the CWI-4 entry may be selected are indicated by the re-write table.

Further, in one embodiment, the re-write table may be implemented in hardware of the data storage drive, in updateable firmware of the data storage drive, etc. In another embodiment, each CWI-4 entry within the CWI-4 set may be selected from one of four predetermined SDSs. This may enable up to two CWI-4 entries from the same SDS to be included within the first CWI-4 set. In yet another embodiment, each CWI-4 entry within the CWI-4 set may be selected from one of eight predetermined SDSs. This may enable up to four CWI-4 entries from the same SDS to be included within the first CWI-4 set.

In this way, a re-write table may be redesigned to allow an increased number of different SDSs from which a CWI-4 entry may be selected at each location of a CWI-4 set. This may enable an increased number of CWI-4 entries from a single SDS to be included within a single CWI-4 set.

Further still, in one embodiment, for each location within the CWI-4 set, each SDS within the predetermined subset of SDSs from which the CWI-4 entry may be selected may be associated with a priority, according to the predetermined re-write table. For example, a first half of the predetermined subset of SDSs may be associated with a first priority, and a second half of the predetermined subset of SDSs may be associated with a second priority. In another example, the second priority may be lower than the first priority.

Also, in one embodiment, for each location within the CWI-4 set, if no CWI-4 entries are available for re-write from the predetermined subset of SDSs having the first priority, a CWI-4 entry may be selected from the predetermined subset of SDSs having the second priority. In another embodiment, each CWI-4 entry within the CWI-4 set may be selected from one of four predetermined SDSs with a first priority, and optionally one of four predetermined SDSs with a second priority (if no CWI-4 entries are found within the four predetermined SDSs with a first priority). In yet another embodiment, each CWI-4 entry within the CWI-4 set may be selected from one of eight predetermined SDSs with a first priority, and optionally one of eight predetermined SDSs with a second priority (if no CWI-4 entries are found within the eight predetermined SDSs with a first priority).

In addition, in one embodiment, for a single location within the CWI-4 set, the priority associated with the SDSs for that location may be staggered with respect to priorities associated with the SDSs for adjacent locations within the CWI-4 set. For example, a predetermined first-priority subset of SDSs for a single location within the CWI-4 set may be divided into two predetermined subsets of SDSs that are included in predetermined second-priority subsets for two adjacent locations of the single location within the CWI-4 set. In this way, neighboring locations within the CWI-4 set may be prevented from having CWI-4 entries from the same SDS. Also, deep interleaving may be enabled during re-writing by spacing CWI-4 entries from the same SDS as far away from each other as possible. This may improve a performance of error correction decoding by spreading errors as evenly as possible among code words.

Furthermore, method 600 may proceed with operation 606, where the first CWI-4 set is re-written to the data storage cartridge. In one embodiment, the first CWI-4 set may be written with a second CWI-4 set to the data storage cartridge. For example, a minimum of two CWI-4 sets (e.g., one codeword object (CO) set) may need to be re-written to the data storage cartridge. In another embodiment, the first CWI-4 set may be appended to CWI-4 sets previously written to the data storage cartridge (e.g., during an initial write operation, etc.).

In this way, a plurality of CWI-4 entries from a single SDS may be included within a single CWI-4 set during re-write. This may reduce a number of CWI-4 sets that need to be re-written (e.g., when multiple CWI-4 entries from a single SDS need to be rewritten). Additionally, a restriction as to where CWI-4 entries may be placed within CWI-4 sets may be reduced during re-write. This may increase a density of written CWI-4s during re-write, which may enable faster, more efficient rewriting that uses less power, which thereby improves the functionality of a data storage drive performing re-writing operations.

Additionally, a size of a re-write area within a data storage cartridge may be reduced, while maintaining an error rate of a data write. Alternately, higher data write error rates may be tolerated while writing to a data storage cartridge, while maintaining a re-write area within the data storage cartridge.

Prioritized Sourcing for Efficient Rewriting

Tape storage employs byte-oriented error correction codes. Relatively long (about 1 kB) longitudinal interleaved error correction code words, also known as code word interleaves (CWI), are written on tape tracks. In current data storage drive architectures CWIs consist of four byte-interleaved Reed-Solomon codewords. During read-while write CWIs in a Data Set (DS) containing too many errors are rewritten after the writing of a data set has been completed. Two CWI sets correspond to a codeword object (CO) set which represents the minimum nonzero amount of data that can be written or rewritten on tape. The operating point is selected such that at the beginning of life of a data storage drive, the average number of rewritten CWI sets per DS is limited to about 1% rewrite rate corresponding to two (four) rewritten CWI sets per data set in data storage drives. The rewrite rate of 1% is currently reached when the byte error rate at the C1 decoder input is around 1e-4.

In current data storage drives, rewrite tables allocate at most one CWI-4 (m=1) from a particular sub data set (SDS) in a rewritten CWI-4 set. This type of scheduling results in reduced rewrite efficiency. Therefore, there is a need to design rewrite tables with increased rewrite efficiency.

Overview

Rewrite tables with prioritized sourcing for efficient rewriting are designed that can allocate up to m=2 or m=4 CWI-4 s from the same SDS in a CWI-4 set during rewrite. Two priority classes with a disjoint set of SDS numbers are defined for placing CWI-4s on a track in a rewritten CWI-4 Set.

The rewrite algorithm first attempts to place CWI-4s, which have been scheduled for rewriting because they satisfied the rewrite condition, with SDS numbers from a high-priority class. If this is not possible because the SDSs in the high-priority class do not contain CWI-4s that have to be rewritten, it attempts to place CWI-4s from the low-priority class. In addition, the rewrite algorithm ensures that neighboring tracks do not have rewritten CWI-4s with the same SDS number within the same rewritten CWI-4 set.

The performance analysis of the rewrite algorithm using a two-state Markov error model at the input of the C1 decoder indicates that the error rate at the input of the C1 decoder can increase by 2× without increasing the area on tape reserved for rewrite. Thus, the areal density of stored data can be increased until the error rate at the input of the C1 decoder is 2× larger while the area on tape reserved for rewrite remains the same.

Re-Write Table Designs

Table 1 illustrates an exemplary re-write table design that enables increased SDS selection for each CWI-4 set entry, in accordance with one embodiment. Of course, it should be noted that the exemplary re-write table design shown in Table 1 is set forth for illustrative purposes only, and thus should not be construed as limiting in any manner.

TABLE 1

M = number of tracks (channels)
S = number of SDSs
t = logical track number, t = 0, 1, . . . , M − 1
c = rewritten CWI-4 Set number, c = 0, 1, . . .
p = SDS number, p = 0, 1, . . . , S − 1
G = number of SDSs from which a CWI-4 entry may be selected within a track location of a single CWI-4 set
m = maximum number of track locations within a single CWI-4 set that may contain CWI-4 entries from the same SDS
For G=4 (m=2), four Sub Data Sets $p_0$, $p_1$, $p_2$ and $p_3$ can allocate a CWI-4 on logical track t within a CWI-4 Set number c. Therefore, the rewrite table is specified by four functions
    $p_0 = f_0(c,t)$,        $p_1 = f_1(c,t)$,        $p_2 = f_2(c,t)$,        $p_3 = f_3(c,t)$.
For G=8 (m=4), eight Sub Data Sets $p_1$, $p_2$, $p_3$, $p_4$, $p_5$, $p_6$, $p_7$ and $p_8$ can allocate a CWI-4 on logical track t within a CWI-4 Set number c. Therefore, the rewrite table is specified by eight functions
    $p_0 = f_0(c,t)$,        $p_1 = f_1(c,t)$,        $p_2 = f_2(c,t)$,        $p_3 = f_3(c,t)$,
    $p_4 = f_4(c,t)$,        $p_5 = f_5(c,t)$,        $p_6 = f_6(c,t)$,        $p_7 = f_7(c,t)$.
It is convenient to have the same notation $f_i(c,t)$, i=0,1,2,3, for G=4 and G=8, although these functions do not have to be the same for G=4 and G=8.

Table 2 illustrates an exemplary re-write table design for a 32-element data storage drive write head, in accordance with one embodiment. Of course, it should be noted that the exemplary re-write table design shown in Table 2 is set forth for illustrative purposes only, and thus should not be construed as limiting in any manner.

TABLE 2

Figure 7:
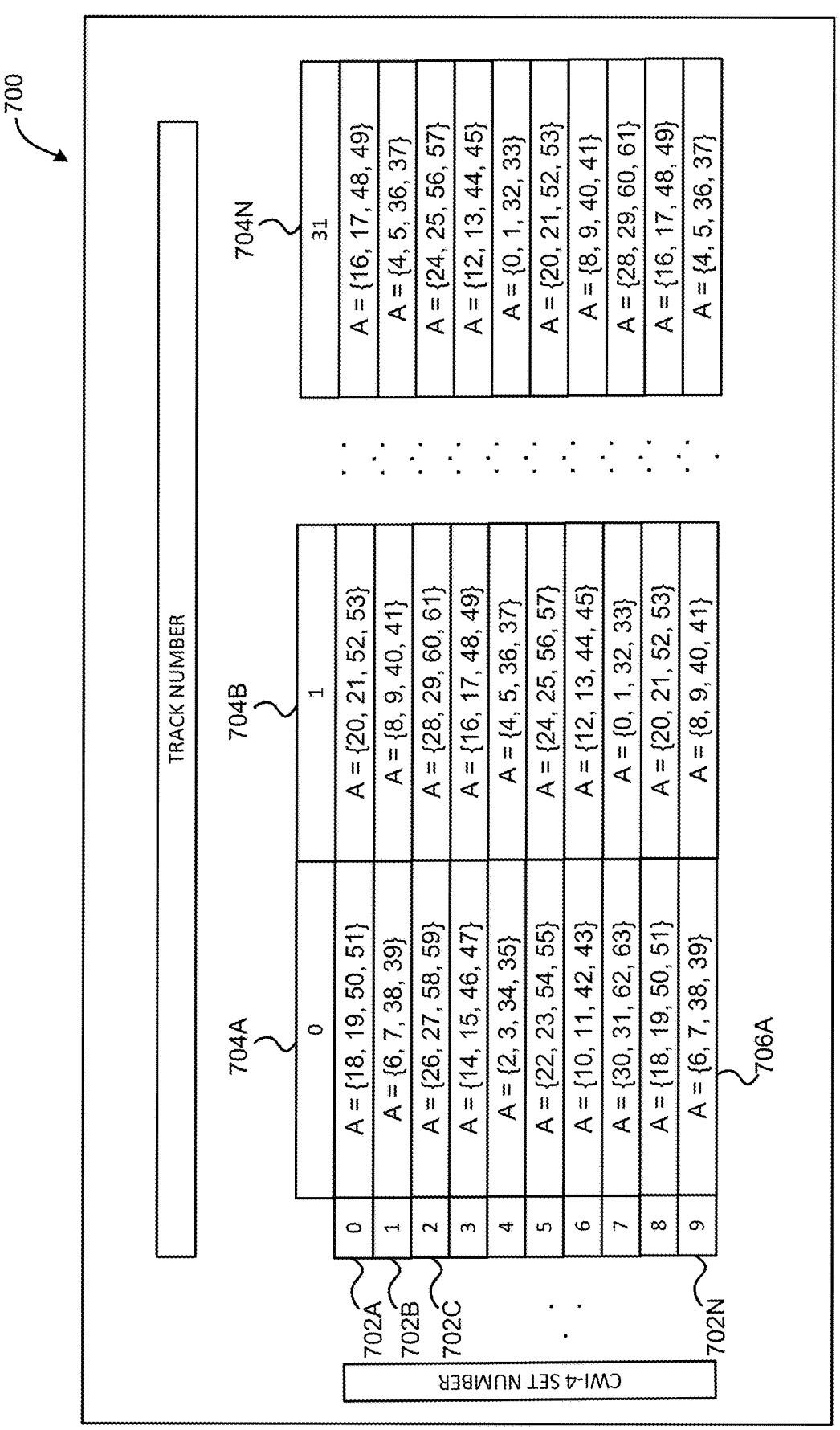
FIG. 7 illustrates an exemplary rewrite table where G=4 (m=2), M=32, and S=64, in accordance with one embodiment.

M = number of tracks (channels)
S = number of SDSs
t = logical track number, t = 0, 1, . . . , 31 for M=32
c = rewritten CWI-4 Set number, c = 0, 1, . . .
p = SDS number, p = 0, 1, . . . , 63 for S=64
G = number of SDSs from which a CWI-4 entry may be selected within a track location of a CWI-4 set
m = maximum number of track locations within a single CWI-4 set that may contain CWI-4 entries from the same SDS
For G=4 (m=2)
    $p_0 = \mod(2(t-7-6c), 32)$,          $p_1 = \mod(2(t-7-6c), 32) + 1$,
    $p_2 = \mod(2(t-7-6c), 32) + 32$,    $p_3 = \mod(2(t-7-6c), 32) + 33$.
For G=8 (m=4)
    $p_0 = \mod(4(t-5-4c), 32)/2$,       $p_1 = \mod(4(t-5-4c), 32)/2 + 1$,
    $p_2 = \mod(4(t-5-4c), 32)/2 + 16$,   $p_3 = \mod(4(t-5-4c), 32)/2 + 17$,
    $p_4 = \mod(4(t-5-4c), 32)/2 + 32$,   $p_5 = \mod(4(t-5-4c), 32)/2 + 33$,
    $p_6 = \mod(4(t-5-4c), 32)/2 + 48$,   $p_7 = \mod(4(t-5-4c), 32)/2 + 49$ FIG. 7 illustrates an exemplary rewrite table 700 where G=4 (m=2), M=32, and S=64, according to one exemplary embodiment. As shown, the rewrite table 700 includes a list of CW1-4 sets 702A-N to be written to a data storage cartridge. Each of the CW1-4 sets 702A-N has a list of available track locations 704A-N that are associated with an available number of elements on a write head of a data storage drive. For example, since M=32, a write head with 32 elements results in 32 available track locations (e.g., 0-31, etc.).

Additionally, in one embodiment, CWI-4 sets 702A-N may be grouped in pairs (called a codeword object (CO) set) in order to represent the minimum nonzero amount of data that can be written or rewritten on tape. Further, each entry within the rewrite table 700 has an associated grouping A which represents the available SDSs from which a CWI-4 entry may be selected.

For example, with respect to a first entry 706A within an Nth CWI-4 set 702N at a first track location 704A, a CWI-4 entry may be selected from an associated grouping A={6, 7, 38, 39}. This means that a CWI-4 entry may be selected for the first entry 706A from one of four SDS numbers: 6, 7, 38, and 39. In this example, there are 64 SDSs (S=64), and a CWI-4 entry may be selected from one of four predetermined SDSs (G=4).

In this way, the exemplary rewrite table 700 may enable a single CWI-4 set 702A-N to have at most two track locations with CWI-4 entries from the same SDS. This increases a number of CWI-4 entries that may be rewritten in a single write of a CWI-4 set 702A-N, which may reduce a number of necessary re-writes.

FIG. 8 illustrates an exemplary rewrite table 800 where G=8 (m=4), M=32, and S=64, according to one exemplary embodiment. As shown, the rewrite table 800 includes a list of CWI-4 sets 802A-N to be written to a data storage cartridge. Each of the CWI-4 sets 802A-N has a list of available track locations 804A-N that are associated with an available number of elements on a write head of a data storage drive. For example, since M=32, a write head with 32 elements results in 32 available track locations (e.g., 0-31, etc.).

Additionally, in one embodiment, CWI-4 sets 802A-N may be grouped in pairs (called a codeword object (CO) set) in order to represent the minimum nonzero amount of data that can be written or rewritten on tape. Further, each entry within the rewrite table 800 has an associated grouping A which represents the available SDSs from which a CWI-4 entry may be selected.

For example, with respect to a first entry 806A within an Nth CWI-4 set 802N at a first track location 804A, a CWI-4 entry may be selected from an associated grouping A={14, 15, 30, 31, 46, 47, 62, 63}. This means that a CWI-4 entry may be selected for the first entry 806A from one of eight SDS numbers: 14, 15, 30, 31, 46, 47, 62, 63. In this example, there are 64 SDSs (S=64), and a CWI-4 entry may be selected from one of eight predetermined SDSs (G=8).

In this way, the exemplary rewrite table 800 may enable a single CWI-4 set 802A-N to have at most four track locations with CWI-4 entries from the same SDS. This increases a number of CWI-4 entries that may be rewritten in a single write of a CWI-4 set 802A-N, which may reduce a number of necessary re-writes.

Table 3 illustrates two exemplary re-write table designs with prioritized sourcing for a 32-element data storage drive write head where G=4, in accordance with one embodiment. Of course, it should be noted that the exemplary re-write table designs shown in Table 3 are set forth for illustrative purposes only, and thus should not be construed as limiting in any manner.

TABLE 3

$A = \{p_0, p_1, p_2, p_3\} = \{f_0(c,t), f_1(c,t), f_2(c,t), f_3(c,t)\}$ has higher priority
and
$B = \{p_4, p_5, p_6, p_7\} = \{f_4(c,t), f_5(c,t), f_6(c,t), f_7(c,t)\}$ has lower priority
$p_0 = \mod(2(t-7-6c), 32)$,      $p_1 = \mod(2(t-7-6c), 32) + 1$,
$p_2 = \mod(2(t-7-6c), 32) + 32$,   $p_3 = \mod(2(t-7-6c), 32) + 33$,
$p_4 = \mod(2(t-6-6c), 32)$,      $p_5 = \mod(2(t-6-6c), 32) + 1$,
$p_6 = \mod(2(t-6-6c), 32) + 32$,   $p_7 = \mod(2(t-6-6c), 32) + 33$.
$A = \{p_0, p_1, p_2, p_3\} = \{f_0(c,t), f_1(c,t), f_2(c,t), f_3(c,t)\}$ has higher priority
and
$B = \{p_4, p_5, p_6, p_7\} = \{f_4(c,t), f_5(c,t), f_6(c,t), f_7(c,t)\}$ has lower priority
$p_0 = \mod(2(t-7-6c), 32)$,      $p_1 = \mod(2(t-7-6c), 32) + 1$,
$p_2 = \mod(2(t-7-6c), 32) + 32$,   $p_3 = \mod(2(t-7-6c), 32) + 33$,
$p_4 = \mod(2(t-8-6c), 32)$,      $p_5 = \mod(2(t-8-6c), 32) + 1$,
$p_6 = \mod(2(t-8-6c), 32) + 32$,   $p_7 = \mod(2(t-8-6c), 32) + 33$ Table 4 illustrates two exemplary re-write table designs with prioritized sourcing for a 32-element data storage drive write head where G=8, in accordance with one embodiment.

Of course, it should be noted that the exemplary re-write table designs shown in Table 3 are set forth for illustrative purposes only, and thus should not be construed as limiting in any manner.

rewrite table 1000 includes a list of CWI-4 sets 1002A-N to be written to a data storage cartridge. Each of the CWI-4 sets 1002A-N has a list of available track locations 1004A-N that are associated with an available number of elements on a

TABLE 4

$A = \{p_0, p_1, p_2, p_3, p_4, p_5, p_6, p_7\} = \{f_0(c,t), f_1(c,t), f_2(c,t), f_3(c,t), f_4(c,t), f_5(c,t), f_6(c,t), f_7(c,t)\}$ has higher priority and
$B = \{p_8, p_9, p_{10}, p_{11}, p_{12}, p_{13}, p_{14}, p_{15}\} = \{f_8(c,t), f_9(c,t), f_{10}(c,t), f_{11}(c,t), f_{12}(c,t), f_{13}(c,t), f_{14}(c,t), f_{15}(c,t)\}$ has lower priority $p_0 = \mod(4(t-5-4c),32)/2$,
$p_1 = \mod(4(t-5-4c),32)/2 + 1$,
$p_2 = \mod(4(t-5-4c),32)/2 + 16$,
$p_3 = \mod(4(t-5-4c),32)/2 + 17$,
$p_4 = \mod(4(t-5-4c),32)/2 + 32$,
$p_5 = \mod(4(t-5-4c),32)/2 + 33$,
$p_6 = \mod(4(t-5-4c),32)/2 + 48$,
$p_7 = \mod(4(t-5-4c),32)/2 + 49$,
$p_8 = \mod(4(t-6-4c),32)/2$,
$p_9 = \mod(4(t-6-4c),32)/2 + 1$,
$p_{10} = \mod(4(t-6-4c),32)/2 + 16$,
$p_{11} = \mod(4(t-6-4c),32)/2 + 17$,
$p_{12} = \mod(4(t-6-4c),32)/2 + 32$,
$p_{13} = \mod(4(t-6-4c),32)/2 + 33$,
$p_{14} = \mod(4(t-6-4c),32)/2 + 48$,
$p_{15} = \mod(4(t-6-4c),32)/2 + 49$ $A = \{p_0, p_1, p_2, p_3, p_4, p_5, p_6, p_7\} = \{f_0(c,t), f_1(c,t), f_2(c,t), f_3(c,t), f_4(c,t), f_5(c,t), f_6(c,t), f_7(c,t)\}$ has higher priority and
$B = \{p_8, p_9, p_{10}, p_{11}, p_{12}, p_{13}, p_{14}, p_{15}\} = \{f_8(c,t), f_9(c,t), f_{10}(c,t), f_{11}(c,t), f_{12}(c,t) f_{13}(c,t), f_{14}(c,t), f_{15}(c,t)\}$ has lower priority $p_0 = \mod(4(t-5-4c),32)/2$,
$p_1 = \mod(4(t-5-4c),32)/2 + 1$,
$p_2 = \mod(4(t-5-4c),32)/2 + 16$,
$p_3 = \mod(4(t-5-4c),32)/2 + 17$,
$p_4 = \mod(4(t-5-4c),32)/2 + 32$,
$p_5 = \mod(4(t-5-4c),32)/2 + 33$,
$p_6 = \mod(4(t-5-4c),32)/2 + 48$,
$p_7 = \mod(4(t-5-4c),32)/2 + 49$,
$p_8 = \mod(4(t-4-4c),32)/2$,
$p_9 = \mod(4(t-4-4c),32)/2 + 1$,
$p_{10} = \mod(4(t-4-4c),32)/2 + 16$,
$p_{11} = \mod(4(t-4-4c),32)/2 + 17$,
$p_{12} = \mod(4(t-4-4c),32)/2 + 32$,
$p_{13} = \mod(4(t-4-4c),32)/2 + 33$,
$p_{14} = \mod(4(t-4-4c),32)/2 + 48$,
$p_{15} = \mod(4(t-4-4c),32)/2 + 49$ FIG. 9 illustrates an exemplary rewrite table 900 with prioritized sourcing where G=4 (m=2), M=32, and S=64, according to one exemplary embodiment. As shown, the rewrite table 900 includes a list of CWI-4 sets 902A-N to be written to a data storage cartridge. Each of the CWI-4 sets 902A-N has a list of available track locations 904A-N that are associated with an available number of elements on a write head of a data storage drive. For example, since M=32, a write head with 32 elements results in 32 available track locations (e.g., 0-31, etc.).

Additionally, in one embodiment, CWI-4 sets 902A-N may be grouped in pairs (called a codeword object (CO) set) in order to represent the minimum nonzero amount of data that can be written or rewritten on tape. Further, each entry within the rewrite table 900 has an associated grouping A which represents the available SDSs from which a CWI-4 entry may be selected.

For example, with respect to a first entry 906A within an Nth CWI-4 set 902N at a first track location 904A, a CWI-4 entry may be selected from an associated first priority grouping A={14, 15, 46, 47}, or a second priority grouping B={16, 17, 48, 49}. This means that a CWI-4 entry may be selected for the first entry 906A from one of four SDS numbers from a first priority grouping: 14, 15, 46, 47, and if a CWI-4 entry is not found within one of those four SDS numbers, the CWI-4 entry may be selected for the first entry 906A from one of four SDS numbers from a second priority grouping: 16, 17, 48, 49.

In this way, errors may be spread as evenly as possible throughout the re-write table, which may improve a performance of error correction decoding.

FIG. 10 illustrates an exemplary rewrite table 1000 with prioritized sourcing where G=8 (m=4), M=32, and S=64, according to one exemplary embodiment. As shown, the write head of a data storage drive. For example, since M=32, a write head with 32 elements results in 32 available track locations (e.g., 0-31, etc.).

Additionally, in one embodiment, CWI-4 sets 1002A-N may be grouped in pairs (called a codeword object (CO) set) in order to represent the minimum nonzero amount of data that can be written or rewritten on tape. Further, each entry within the rewrite table 1000 has an associated grouping A which represents the available SDSs from which a CWI-4 entry may be selected.

For example, with respect to a first entry 1006A within an Nth CWI-4 set 1002N at a first track location 1004A, a CWI-4 entry may be selected from an associated first priority grouping A={14, 15, 30, 31, 46, 47, 62, 63}, or a second priority grouping B={12, 13, 28, 29, 44, 45, 60, 61}. This means that a CWI-4 entry may be selected for the first entry 1006A from one of eight SDS numbers from a first priority grouping: 14, 15, 30, 31, 46, 47, 62, 63, and if a CWI-4 entry is not found within one of those eight SDS numbers, the CWI-4 entry may be selected for the first entry 1006A from one of eight SDS numbers from a second priority grouping: 12, 13, 28, 29, 44, 45, 60, 61.

In this way, errors may be spread as evenly as possible throughout the re-write table, which may improve a performance of error correction decoding.

Table 5 illustrates an exemplary re-write table design with staggered prioritized sourcing for a 32-element data storage drive write head where G=4, in accordance with one embodiment. Of course, it should be noted that the exemplary re-write table design shown in Table 5 is set forth for illustrative purposes only, and thus should not be construed as limiting in any manner.

TABLE 5

$A = \{p_0, p_1, p_2, p_3\} = \{f_0(c,t), f_1(c,t), f_2(c,t), f_3(c,t)\}$ has higher priority and $B = B_1 \cup B_2$ has lower priority where
$B_1 = \{p_4, p_5\} = \{f_4(c,t), f_5(c,t)\}$ and $B_2 = \{p_6, p_7\} = \{f_6(c,t), f_7(c,t)\}$ are spatially staggered in the higher priority TABLE 5-continued $p_0 = \mod(2(t-7-6c),32),$  $p_1 = \mod(2(t-7-6c),32) + 1,$
$p_2 = \mod(2(t-7-6c),32) + 32,$  $p_3 = \mod(2(t-7-6c),32) + 33,$
$p_4 = \mod(2(t-6-6c),32),$  $p_5 = \mod(2(t-6-6c),32) + 1,$
$p_6 = \mod(2(t-8-6c),32) + 32,$  $p_7 = \mod(2(t-8-6c),32) + 33$ Table 6 illustrates an exemplary re-write table design with staggered prioritized sourcing for a 32-element data storage drive write head where G=8, in accordance with one embodiment. Of course, it should be noted that the exemplary re-write table design shown in Table 6 is set forth for illustrative purposes only, and thus should not be construed as limiting in any manner.

TABLE 6

$A = \{p_0, p_1, p_2, p_3, p_4, p_5, p_6, p_7\} = \{f_0(c,t), f_1(c,t), f_2(c,t), f_3(c,t), f_4(c,t), f_5(c,t), f_6(c,t), f_7(c,t)\}$ has higher priority and
  $B = B_1 \cup B_2$ has lower priority where
  $B_1 = \{p_8, p_9, p_{10}, p_{11}\} = \{f_8(c,t), f_9(c,t), f_{10}(c,t), f_{11}(c,t)\}$ and
  $B_2 = \{p_{12}, p_{13}, p_{14}, p_{15}\} = \{f_{12}(c,t), f_{13}(c,t), f_{14}(c,t), f_{15}(c,t)\}$ are spatially staggered in the higher priority
  $p_0 = \mod(4(t-5-4c),32)/2,$  $p_1 = \mod(4(t-5-4c),32)/2 + 1,$
  $p_2 = \mod(4(t-5-4c),32)/2 + 16,$  $p_3 = \mod(4(t-5-4c),32)/2 + 17,$
  $p_4 = \mod(4(t-5-4c),32)/2 + 32,$  $p_5 = \mod(4(t-5-4c),32)/2 + 33,$
  $p_6 = \mod(4(t-5-4c),32)/2 + 48,$  $p_7 = \mod(4(t-5-4c),32)/2 + 49,$
  $p_8 = \mod(4(t-6-4c),32)/2,$  $p_9 = \mod(4(t-6-4c),32)/2 + 1,$
  $p_{10} = \mod(4(t-6-4c),32)/2 + 16,$  $p_{11} = \mod(4(t-6-4c),32)/2 + 17,$
  $p_{12} = \mod(4(t-4-4c),32)/2 + 32,$  $p_{13} = \mod(4(t-4-4c),32)/2 + 33,$
  $p_{14} = \mod(4(t-4-4c),32)/2 + 48,$  $p_{15} = \mod(4(t-4-4c),32)/2 + 49$ FIG. 11 illustrates an exemplary rewrite table 1100 with staggered prioritized sourcing where G=4 (m=2), M=32, and S=64, according to one exemplary embodiment. As shown, the rewrite table 1100 includes a list of CWI-4 sets 1102A-N to be written to a data storage cartridge. Each of the CWI-4 sets 1102A-N has a list of available track locations 1104A-N that are associated with an available number of elements on a write head of a data storage drive. For example, since M=32, a write head with 32 elements results in 32 available track locations (e.g., 0-31, etc.).

Additionally, in one embodiment, CWI-4 sets 1102A-N may be grouped in pairs (called a codeword object (CO) set) in order to represent the minimum nonzero amount of data that can be written or rewritten on tape. Further, each entry within the rewrite table 1100 has an associated grouping A which represents the available SDSs from which a CWI-4 entry may be selected.

For example, with respect to a first entry 1106A within an Nth CWI-4 set 1102N at a first track location 1104A, a CWI-4 entry may be selected from an associated first priority grouping A={14, 15, 46, 47}, or a second priority grouping B={16, 17, 44, 45}. This means that a CWI-4 entry may be selected for the first entry 1106A from one of four SDS numbers from a first priority grouping: 14, 15, 46, 47, and if a CWI-4 entry is not found within one of those four SDS numbers, the CWI-4 entry may be selected for the first entry 1106A from one of four SDS numbers from a second priority grouping: 16, 17, 44, 45.

Additionally, two SDS group numbers in the first priority grouping of a second entry 1106B (16 and 17) are the same as two SDS group numbers in the second priority grouping of the first entry 1106A, where the second entry 1106B is adjacent to the first entry 1106A. Further, two SDS group numbers in the first priority grouping of the first entry 1106A (46 and 47) are the same as two SDS group numbers in the second priority grouping of the second entry 1106B, where the second entry 1106B is adjacent to the first entry 1106A. In this way, deep interleaving may be enabled during rewriting by spacing CWI-4 entries from the same SDS as far away from each other as possible. This may improve a performance of error correction decoding by spreading errors as evenly as possible.

FIG. 12 illustrates an exemplary rewrite table 1200 with staggered prioritized sourcing where G=8 (m=4), M=32, and S=64, according to one exemplary embodiment. As shown, the rewrite table 1200 includes a list of CWI-4 sets 1202A-N to be written to a data storage cartridge. Each of the CWI-4 sets 1202A-N has a list of available track locations 1204A-N that are associated with an available number of elements on a write head of a data storage drive. For example, since M=32, a write head with 32 elements results in 32 available track locations (e.g., 0-31, etc.).

Additionally, in one embodiment, CWI-4 sets 1202A-N may be grouped in pairs (called a codeword object (CO) set) in order to represent the minimum nonzero amount of data that can be written or rewritten on tape. Further, each entry within the rewrite table 1200 has an associated grouping A which represents the available SDSs from which a CWI-4 entry may be selected.

For example, with respect to a first entry 1206A within an Nth CWI-4 set 1202N at a first track location 1204A, a CWI-4 entry may be selected from an associated first priority grouping A={14, 15, 30, 31, 46, 47, 62, 63}, or a second priority grouping B={12, 13, 28, 29, 32, 33, 48, 49}. This means that a CWI-4 entry may be selected for the first entry 1206A from one of eight SDS numbers from a first priority grouping: 14, 15, 30, 31, 46, 47, 62, 63, and if a CWI-4 entry is not found within one of those eight SDS numbers, the CWI-4 entry may be selected for the first entry 1206A from one of eight SDS numbers from a second priority grouping: 12, 13, 28, 29, 32, 33, 48, 49.

Additionally, four SDS group numbers in the first priority grouping of a second entry 1206B (32, 33, 48, 49) are the same as four SDS group numbers in the second priority grouping of the first entry 1206A, where the second entry 1206B is adjacent to the first entry 1206A. Further, four SDS group numbers in the first priority grouping of the second entry 1206B (14, 15, 30, 31) are the same as four SDS group numbers in the second priority grouping of the second entry 1206B, where the second entry 1206B is adjacent to the first entry 1206A. In this way, deep interleaving may be enabled during re-writing by spacing CWI-4 entries from the same SDS as far away from each other as possible. This may improve a performance of error correction decoding by spreading errors as evenly as possible.

Re-Write Table Implementations

Now referring to FIGS. 13A-D, a flowchart of a method 1300 for implementing a prioritized re-write is shown according to one embodiment. The method 1300 may be performed in accordance with the present invention in any of the environments depicted in FIGS. 1-5, among others, in various embodiments. Of course, more or less operations than those specifically described in FIGS. 13A-D may be included in method 1300, as would be understood by one of skill in the art upon reading the present descriptions.

Each of the steps of the method 1300 may be performed by any suitable component of the operating environment. For example, in various embodiments, the method 1300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1300. Illustrative processors include, but are not limited to, a central processing unit (CPU), an application specific integrated circuit (ASIC), a field programmable gate array (FPGA), etc., combinations thereof, or any other suitable computing device known in the art.

Table 7 illustrates exemplary re-write parameters for use with FIGS. 13A-D, 14A-D, and 15A-D, in accordance with one embodiment. Of course, it should be noted that the exemplary re-write parameters shown in Table 7 are set forth for illustrative purposes only, and thus should not be construed as limiting in any manner.

1300 may proceed with operation 1310, where logical track numbers for placing CWI-4s from higher priority class are initialized: t=0. The method 1300 may then proceed with operation 1312 of FIG. 13B, where SDS numbers are computed/read from the lookup table (LUT) in high priority class: $p_i = f_i(c,t)$, i=0, 1, . . . , G−1. In addition, method 1300 may proceed with operation 1314, where i is initialized (i=0).

Furthermore, method 1300 may proceed with decision 1316, where it is determined whether $Q(p_i)$ is empty. If it is determined in decision 1316 that $Q(p_i)$ is not empty, then method 1300 may proceed with operation 1318, where a CWI-4 is popped from the queue $Q(p_i)$ and written to track t in CWI-4 Set c, and method 1300 may proceed with operation 1320, where $W(t)=p_i$.

Further still, if it is determined in decision 1316 that $Q(p_i)$ is empty, then method 1300 may proceed with operation 1322, where i is incremented (i=i+1), and method 1300 may proceed with decision 1324, where it is determined whether i=G. If it is determined in decision 1324 that i does not equal G, then the method resumes at decision 1316. However, if it is determined in decision 1324 that i=G, then method 1300 may proceed with operation 1326, where t is incremented (t=t+1). Also, method 1300 may proceed with decision 1328, where it is determined whether t=M. If it is determined in decision 1328 that t does not equal M, then the method resumes at operation 1312. If it is determined that t=M, then method 1300 may proceed with operation 1330, where logical track numbers are initialized for placing CWI-4s from lower priority class: t=0.

Figure 13A:
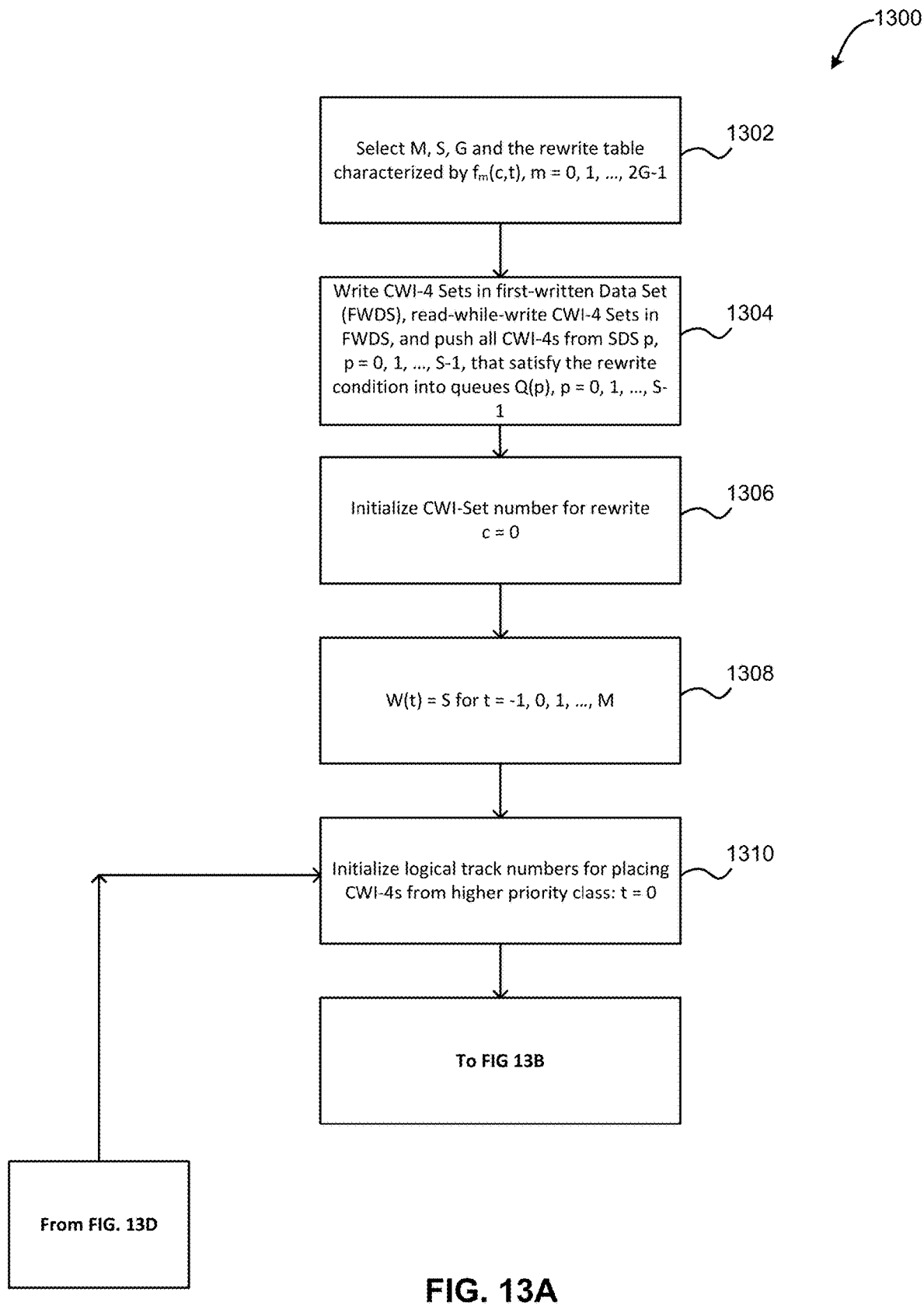
FIGS. 13A-D illustrate a flowchart of a method for implementing a prioritized re-write, in accordance with one embodiment.
Figure 13B:
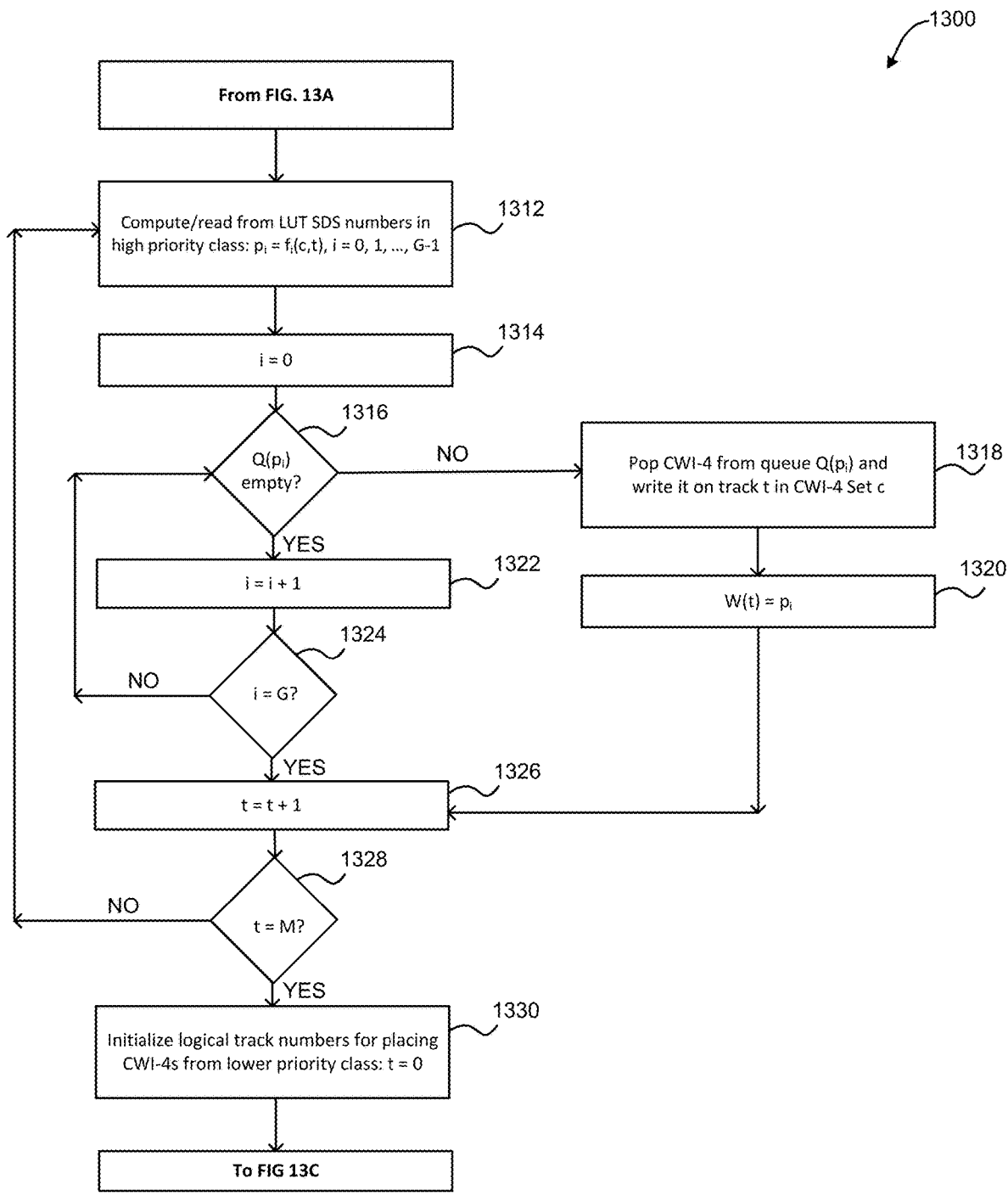
Figure 13C:
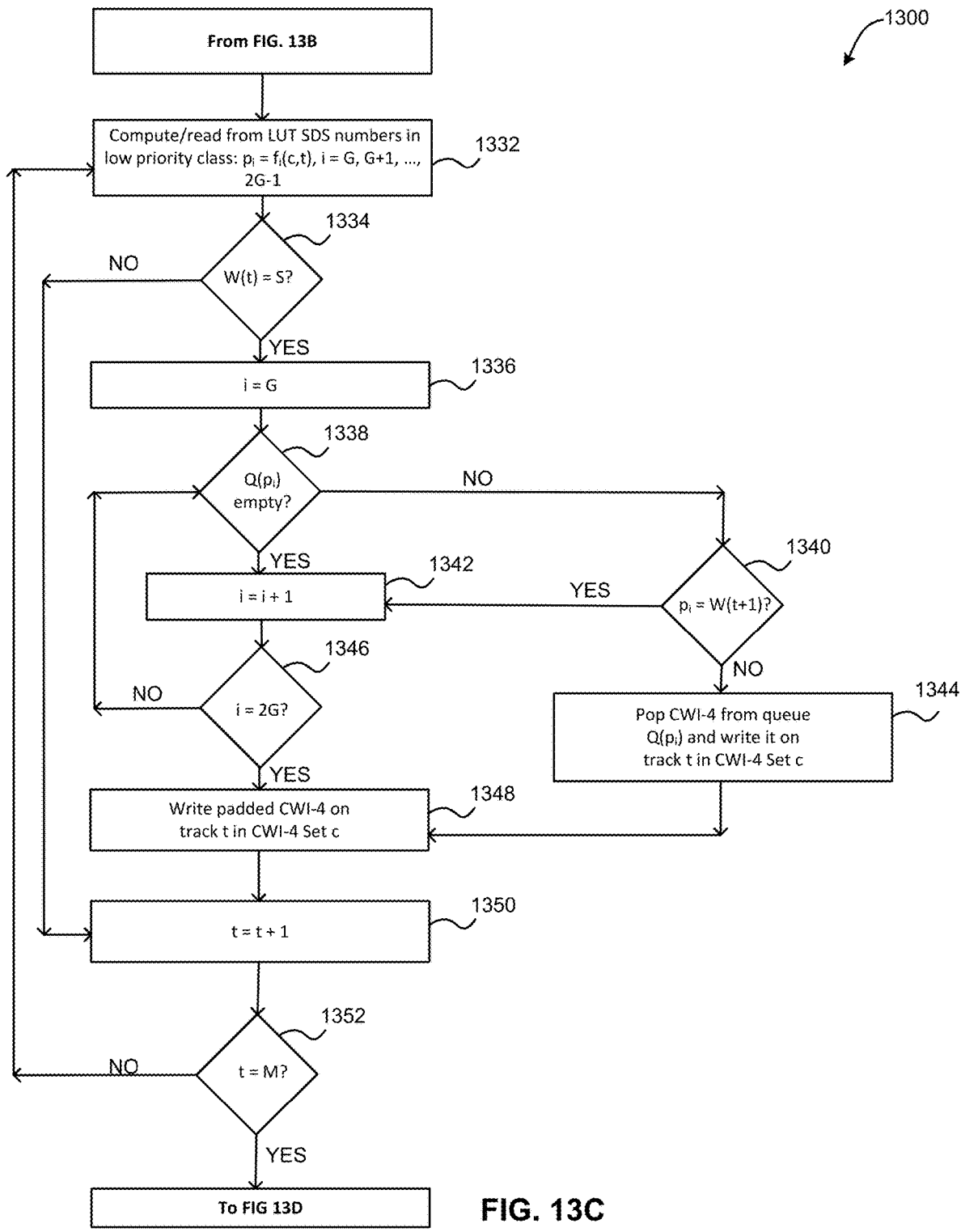
Figure 13D:
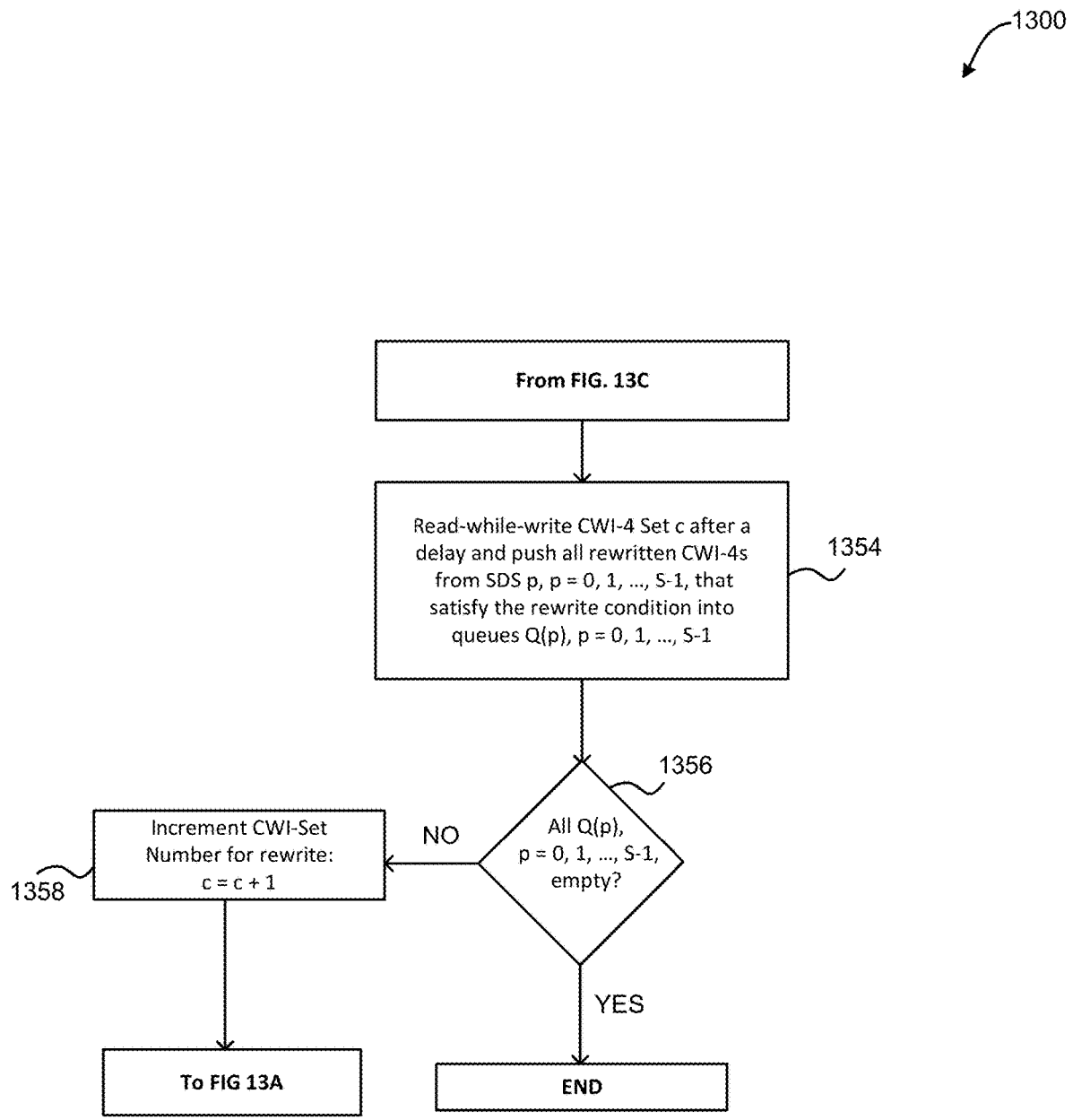

The method 1300 may then proceed with operation 1332 of FIG. 13C, where SDS numbers are computed/read from the LUT in low priority class: $p_i = f_i(c,t)$, i=G, G+1, . . . , 2G−1. Additionally, method 1300 may proceed with decision 1334, where it is determined whether W(t)=S. If it determined in decision 1334 that W(t) does not equal S, then method 1300 may proceed with operation 1350, where t is

TABLE 7

| |
|---|
| Number of channels = M          (M=32) |
| Logical track # = t where 0 ≤ t ≤ M − 1 |
| Number of Sub Data Sets = S (usually =2*M)          (S=64) |
| Sub Data Set # = p where 0 ≤ p ≤ S − 1 |
|    Sub Data Set # = S is an invalid Sub Data Set number as in the case of W(t) = S |
| Auxiliary variable = W(t) contains the Sub Data Set number associated with a rewritten CWI-4 on track t |
|    W(−1) and W(M) are always equal to S which represents an invalid Sub Data Set number |
| Rewritten CWI Set # = c where 0 ≤ c |
| Error threshold for Rewrite = r          (r=3) |
| The rewrite table assigns 2G possible Sub Data numbers associated with a rewritten CWI-4 on track t in rewritten CWI-4 Set number c: |
| $f_i(c,t)$, i = 0, 1, . . . , G − 1 describes the rewrite table for high-priority classes |
| $f_i(c,t)$, i = G, G+1, . . . , 2G − 1 describes the rewrite table for low-priority classes |
| $p_i = f_i(c,t)$ is the i-th possible Sub Data Set number of a rewritten CWI-4 on track t in rewritten CWI-4 Set number c assigned by the rewrite table |

As shown in FIGS. 13A-D, method 1300 may initiate with operation 1302, where M, S, G and the rewrite table characterized by $f_m(c,t)$, m=0, 1, . . . , 2G−1 are selected. Additionally, method 1300 may proceed with operation 1304, where CWI-4 Sets are written in first-written Data Set (FWDS), a read-while-write is performed on CWI-4 Sets in FWDS, and all CWI-4s from SDS p, p=0, 1, . . . , S−1, that satisfy the rewrite condition are pushed into queues Q(p), p=0, 1, . . . , S−1. Further, method 1300 may proceed with operation 1306, where CWI-Set number for rewrite is initialized to c=0.

Further still, method 1300 may proceed with operation 1308, where W(t)=S for t=−1, 0, 1, . . . , M. Also, method incremented (t=t+1). However, if it is determined in decision 1334 that W(t)=S, then method 1300 may proceed with operation 1336, where i=G.

Additionally, method 1300 may proceed with decision 1338, where it is determined whether $Q(p_i)$ is empty. If it is determined in decision 1338 that $Q(p_i)$ is not empty, then method 1300 may proceed with decision 1340, where it is determined whether $p_i=W(t+1)$. If it is determined in decision 1340 that $p_i=W(t+1)$, then method 1300 may proceed with operation 1342, where i is incremented (i=i+1). However, if it is determined in decision 1340 that $p_i$ does not equal W(t+1), then method 1300 may proceed with operation 1344, where CWI-4 is popped from queue Q($p_i$) and written to track t in CWI-4 Set c.

Further, if it is determined in decision 1338 that Q($p_i$) is empty, then method 1300 may proceed with operation 1342, where i is incremented (i=i+1). Additionally, method 1300 may proceed with decision 1346, where it is determined whether i=2G. If it is determined in decision 1346 that i is not equal to 2G, then the method proceeds with decision 1338. However, if it is determined in decision 1346 that i=2G, then method 1300 may proceed with operation 1348, where a padded CWI-4 is written on track t in CWI-4 Set c.

Further still, method 1300 may proceed with operation 1350, where t is incremented (t=t+1). Also, method 1300 may proceed with decision 1352, where it is determined whether t=M. If it is determined in decision 1352 that t does not equal M, then the method proceed with operation 1332. However, if it is determined in decision 1352 that t=M, then method 1300 may proceed with operation 1354 of FIG. 13D, where a read-while-write is performed on CWI-4 Set c after a delay, and all rewritten CWI-4s from SDS p, p=0, 1, . . . , S−1 that satisfy the rewrite condition are pushed into queues Q(p), p=0, 1, . . . , S−1.

Also, method 1300 may proceed with decision 1356, where it is determined whether all Q(p), p=0, 1, . . . , S−1 is empty. If it is determined in decision 1356 that all Q(p), p=0, 1, . . . , S−1 is not empty, then method 1300 may proceed with operation 1358, where a CWI-Set Number is incremented for rewrite: c=c+1. Additionally, the method then proceeds with operation 1308 of FIG. 13A. However, if it is determined in decision 1356 that all Q(p), p=0, 1, . . . , S−1 are empty, then the method stops.

Now referring to FIGS. 14A-D, a flowchart of a method 1400 for implementing another exemplary prioritized rewrite is shown according to one embodiment. The method 1400 may be performed in accordance with the present invention in any of the environments depicted in FIGS. 1-5, among others, in various embodiments. Of course, more or less operations than those specifically described in FIGS. 14A-D may be included in method 1400, as would be understood by one of skill in the art upon reading the present descriptions.

Each of the steps of the method 1400 may be performed by any suitable component of the operating environment. For example, in various embodiments, the method 1400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIGS. 14A-D, method 1400 may initiate with operation 1402, where M, S, G and the rewrite table characterized by $f_i(c,t)$, i=0, 1, . . . , 2G−1 are selected. Additionally, method 1400 may proceed with operation 1404, where CWI-4 Sets are written in first-written Data Set (FWDS), a read-while-write is performed on CWI-4 Sets in FWDS, and all CWI-4s from SDS p, p=0, 1, . . . , S−1, that satisfy the rewrite condition are pushed into queues Q(p), p=0, 1, . . . , S−1. Further, method 1400 may proceed with operation 1406, where CWI-Set number for rewrite is initialized to c=0.

Further still, method 1400 may proceed with operation 1408, where W(t)=S for t=−1, 0, 1, . . . , M. Also, method 1400 may proceed with operation 1410, where logical track numbers for placing CWI-4s from higher priority class are initialized: t=0. The method 1400 may then proceed with operation 1412 of FIG. 14B, where SDS numbers are computed/read from the lookup table (LUT) in high priority class: $p_i = f_i(c,t)$, i=0, 1, . . . , G−1. In addition, method 1400 may proceed with operation 1414, where i is initialized (i=0).

Furthermore, method 1400 may proceed with decision 1416, where it is determined whether Q($p_i$) is empty. If it is determined in decision 1416 that Q($p_i$) is not empty, then method 1400 may proceed with operation 1418, where a CWI-4 is popped from the queue Q($p_i$) and written to track t in CWI-4 Set c, and method 1400 may proceed with operation 1420, where W(t)=$p_i$.

Further still, if it is determined in decision 1416 that Q($p_i$) is empty, then method 1400 may proceed with operation 1422, where i is incremented (i=i+1), and method 1400 may proceed with decision 1424, where it is determined whether i=G. If it is determined in decision 1424 that i does not equal G, then the method resumes at decision 1416. However, if it is determined in decision 1424 that i=G, then method 1400 may proceed with operation 1426, where t is incremented (t=t+1). Also, method 1400 may proceed with decision 1428, where it is determined whether t=M. If it is determined in decision 1428 that t does not equal M, then the method resumes at operation 1412. If it is determined that t=M, then method 1400 may proceed with operation 1430, where logical track numbers are initialized for placing CWI-4s from lower priority class: t=0.

Figure 14A:
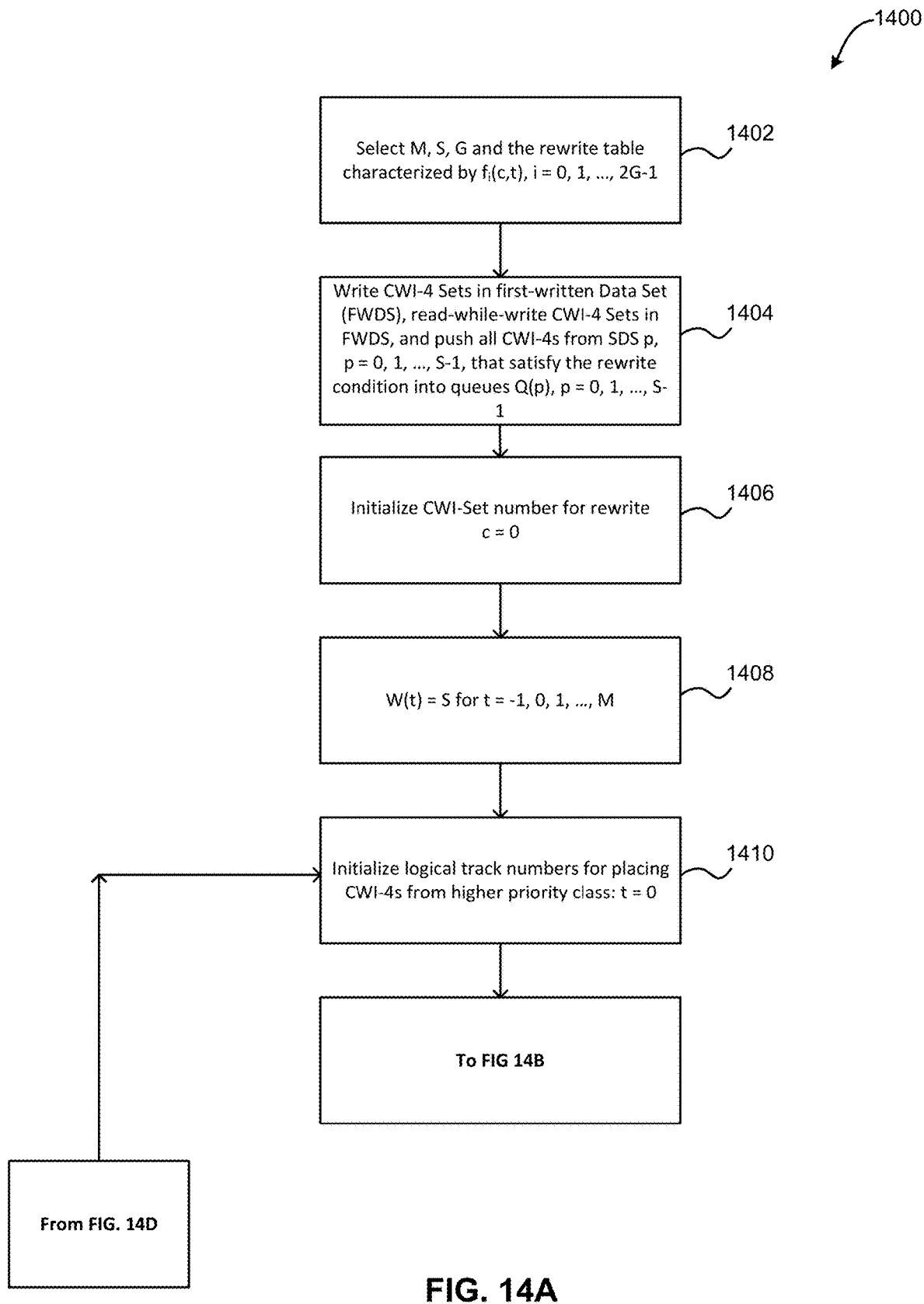
FIGS. 14A-D illustrate a flowchart of a method for implementing another exemplary prioritized re-write, in accordance with one embodiment.
Figure 14B:
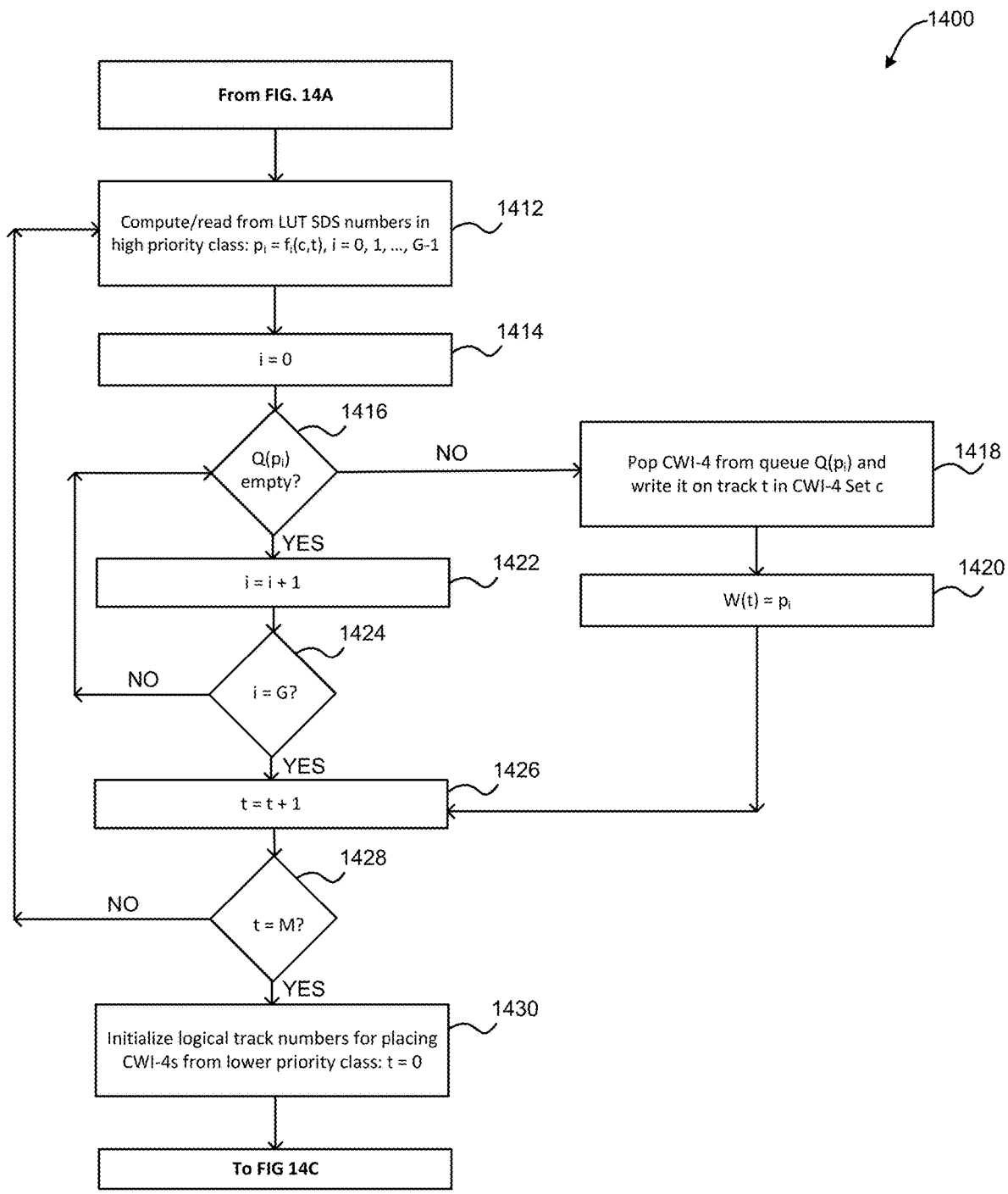
Figure 14C:
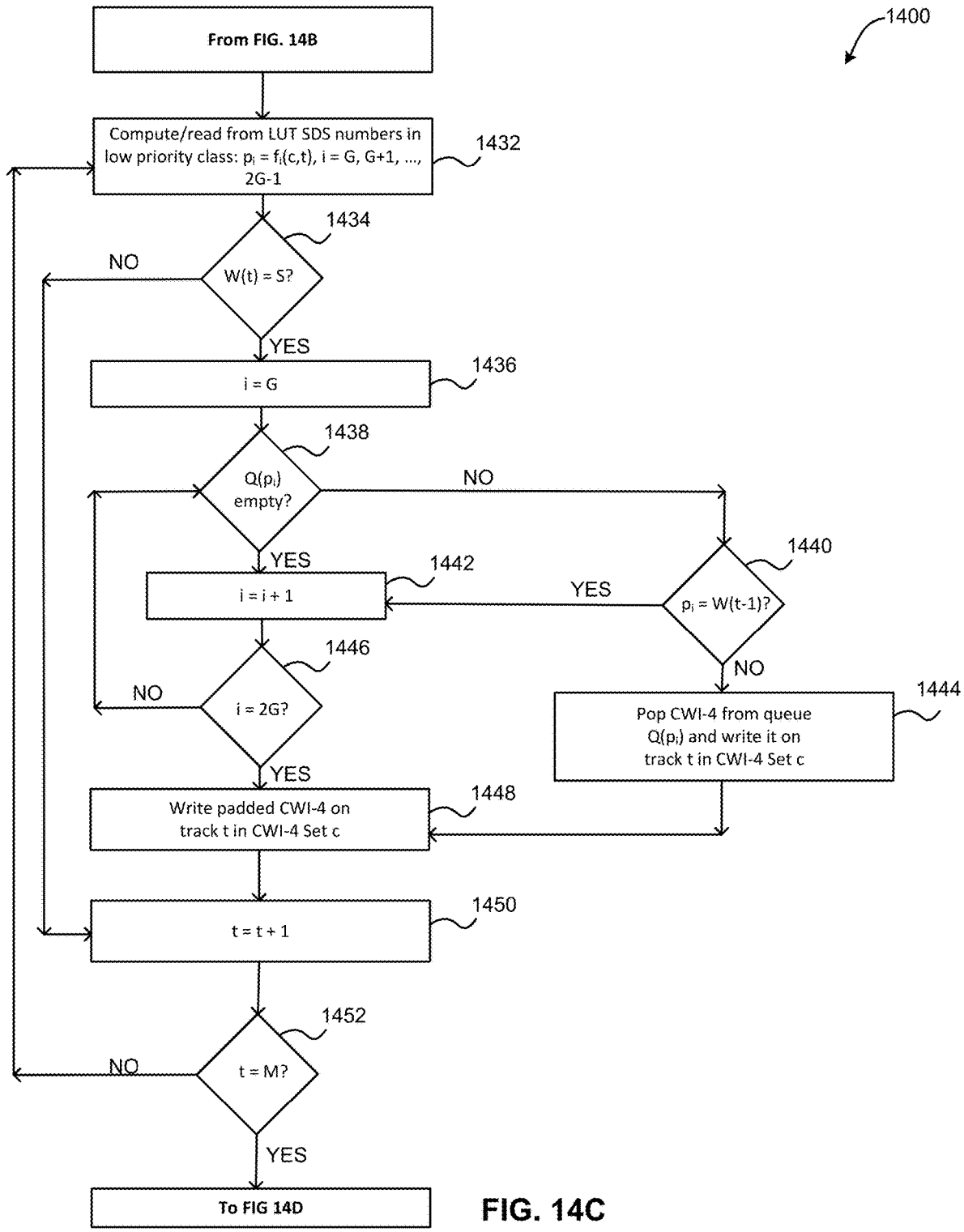

The method 1400 may then proceed with operation 1432 of FIG. 14C, where SDS numbers are computed/read from the LUT in low priority class: $p_i = f_i(c,t)$, i=G, G+1, . . . , 2G−1. Additionally, method 1400 may proceed with decision 1434, where it is determined whether W(t)=S. If it determined in decision 1434 that W(t) does not equal S, then method 1400 may proceed with operation 1450, where t is incremented (t=t+1). However, if it is determined in decision 1434 that W(t)=S, then method 1400 may proceed with operation 1436, where i=G.

Additionally, method 1400 may proceed with decision 1438, where it is determined whether Q($p_i$) is empty. If it is determined in decision 1438 that Q($p_i$) is not empty, then method 1400 may proceed with decision 1440, where it is determined whether $p_i = W(t-1)$. If it is determined in decision 1440 that $p_i = W(t-1)$, then method 1400 may proceed with operation 1442, where i is incremented (i=i+1). However, if it is determined in decision 1440 that $p_i$ does not equal W(t−1), then method 1400 may proceed with operation 1444, where CWI-4 is popped from queue Q($p_i$) and written to track t in CWI-4 Set c.

Further, if it is determined in decision 1438 that Q($p_i$) is empty, then method 1400 may proceed with operation 1442, where i is incremented (i=i+1). Additionally, method 1400 may proceed with decision 1446, where it is determined whether i=2G. If it is determined in decision 1446 that i is not equal to 2G, then the method proceeds with decision 1438. However, if it is determined in decision 1446 that i=2G, then method 1400 may proceed with operation 1448, where a padded CWI-4 is written on track t in CWI-4 Set c.

Further still, method 1400 may proceed with operation 1450, where t is incremented (t=t+1). Also, method 1400 may proceed with decision 1452, where it is determined whether t=M. If it is determined in decision 1452 that t does not equal M, then the method proceed with operation 1432.

Figure 14D:
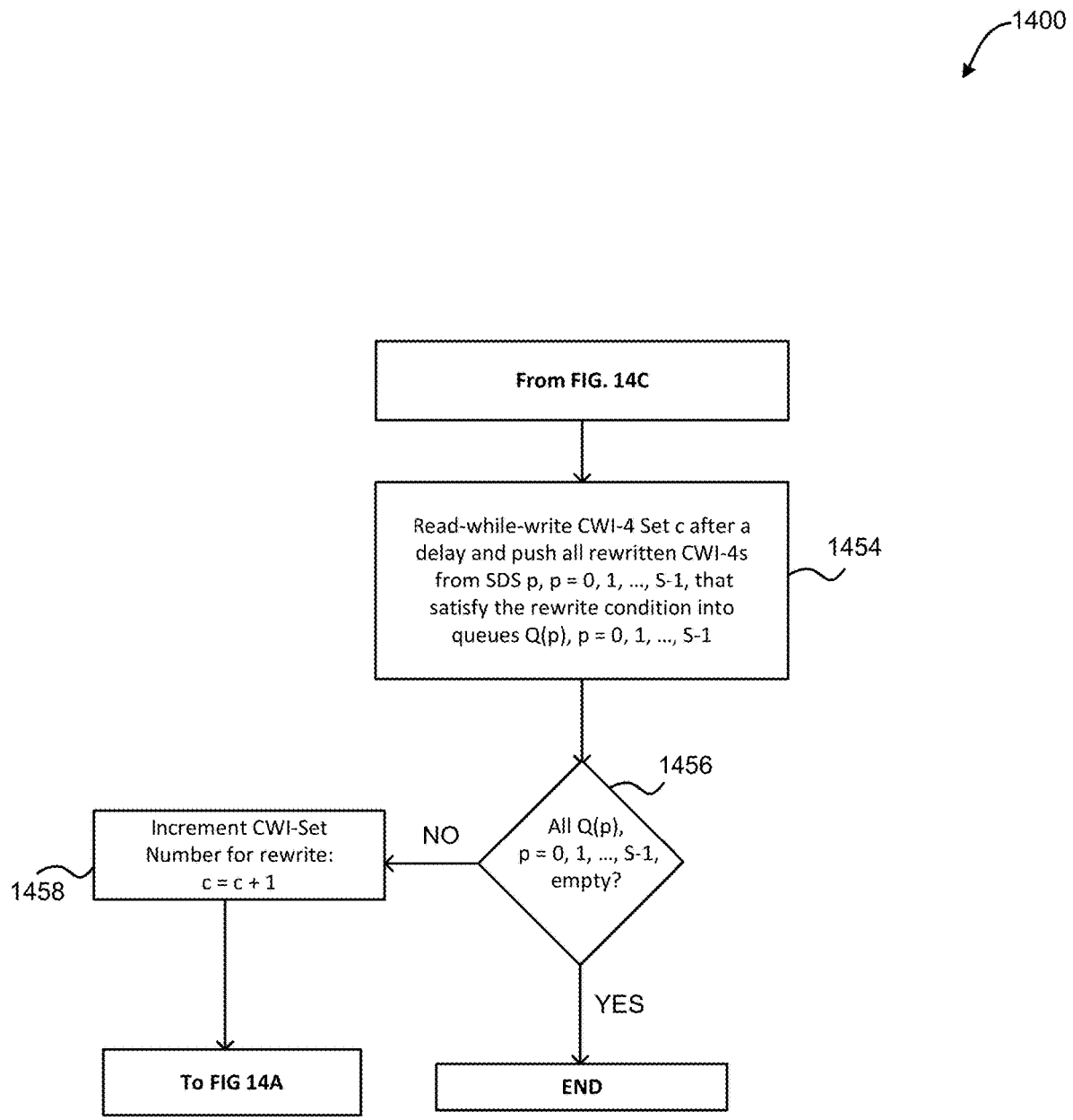

However, if it is determined in decision 1452 that t=M, then method 1400 may proceed with operation 1454 of FIG. 14D, where a read-while-write is performed on CWI-4 Set c after a delay, and all rewritten CWI-4s from SDS p, p=0, 1, . . . , S−1 that satisfy the rewrite condition are pushed into queues Q(p), p=0, 1, . . . , S−1.

Also, method 1400 may proceed with decision 1456, where it is determined whether all Q(p), p=0, 1, . . . , S−1 is empty. If it is determined in decision 1456 that all Q(p), p=0, 1, . . . , S−1 is not empty, then method 1400 may proceed with operation 1458, where a CWI-Set Number is incremented for rewrite: c=c+1. Additionally, the method then proceeds with operation 1408 of FIG. 14A. However, if it is determined in decision 1456 that all Q(p), p=0, 1, . . . , S−1 are empty, then the method stops.

Now referring to FIGS. 15A-D, a flowchart of a method 1500 for implementing another exemplary prioritized rewrite is shown according to one embodiment. The method 1500 may be performed in accordance with the present invention in any of the environments depicted in FIGS. 1-5, among others, in various embodiments. Of course, more or less operations than those specifically described in FIGS. 15A-D may be included in method 1500, as would be understood by one of skill in the art upon reading the present descriptions.

Each of the steps of the method 1500 may be performed by any suitable component of the operating environment. For example, in various embodiments, the method 1500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIGS. 15A-D, method 1500 may initiate with operation 1502, where M, S, G and the rewrite table characterized by $f_i(c,t)$, i=0, 1, . . . , 2G−1 are selected. Additionally, method 1500 may proceed with operation 1504, where CWI-4 Sets are written in first-written Data Set (FWDS), a read-while-write is performed on CWI-4 Sets in FWDS, and all CWI-4s from SDS p, p=0, 1, . . . , S−1, that satisfy the rewrite condition are pushed into queues Q(p), p=0, 1, . . . , S−1. Further, method 1500 may proceed with operation 1506, where CWI-Set number for rewrite is initialized to c=0.

Further still, method 1500 may proceed with operation 1508, where W(t)=S for t=−1, 0, 1, . . . , M. Also, method 1500 may proceed with operation 1510, where logical track numbers for placing CWI-4s from higher priority class are initialized: t=0. The method 1500 may then proceed with operation 1512 of FIG. 15B, where SDS numbers are computed/read from the lookup table (LUT) in high priority class: $p_i=f_i(c,t)$, i=0, 1, . . . , G−1. In addition, method 1500 may proceed with operation 1514, where i is initialized (i=0).

Furthermore, method 1500 may proceed with decision 1516, where it is determined whether Q($p_i$) is empty. If it is determined in decision 1516 that Q($p_i$) is not empty, then method 1500 may proceed with operation 1518, where a CWI-4 is popped from the queue Q($p_i$) and written to track t in CWI-4 Set c, and method 1500 may proceed with operation 1520, where W(t)=$p_i$.

Further still, if it is determined in decision 1516 that Q($p_i$) is empty, then method 1500 may proceed with operation 1522, where i is incremented (i=i+1), and method 1500 may proceed with decision 1524, where it is determined whether i=G. If it is determined in decision 1524 that i does not equal G, then the method resumes at decision 1516. However, if it is determined in decision 1524 that i=G, then method 1500 may proceed with operation 1526, where t is incremented (t=t+1). Also, method 1500 may proceed with decision 1528, where it is determined whether t=M. If it is determined in decision 1528 that t does not equal M, then the method resumes at operation 1512. If it is determined that t=M, then method 1500 may proceed with operation 1530, where logical track numbers are initialized for placing CWI-4s from lower priority class: t=0.

Figure 15A:
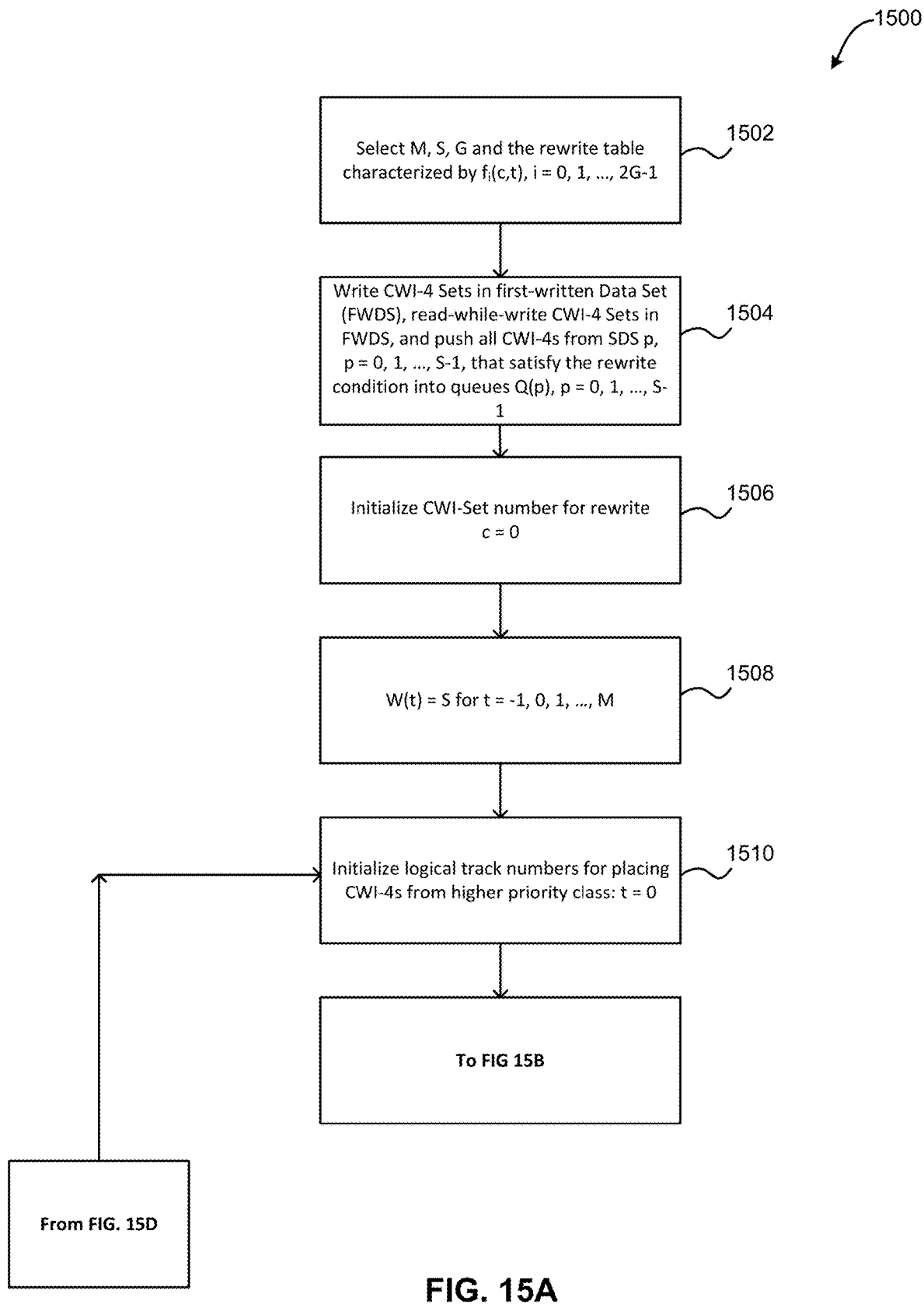
FIGS. 15A-D illustrate a flowchart of a method for implementing another exemplary prioritized re-write, in accordance with one embodiment.
Figure 15B:
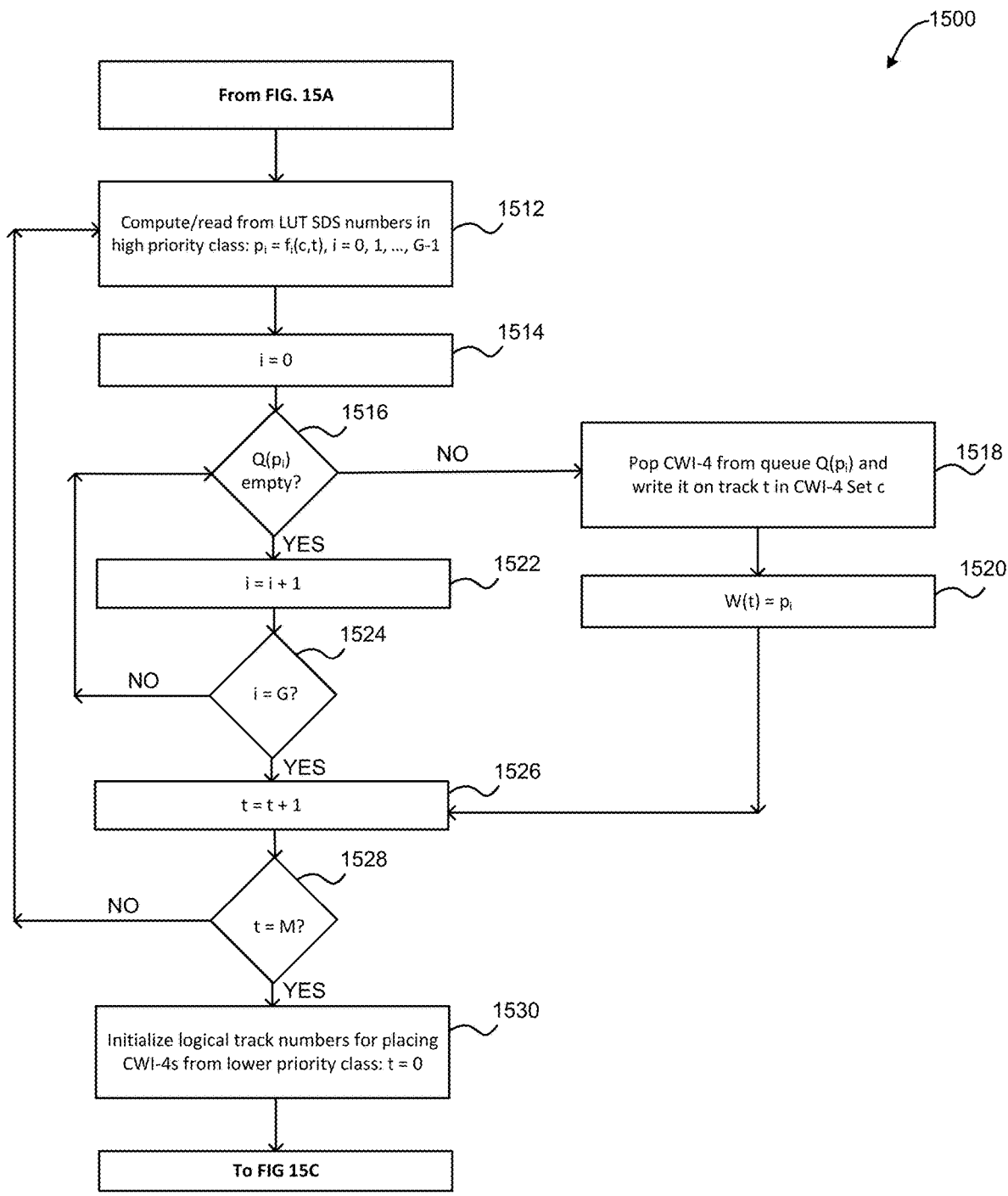
Figure 15C:
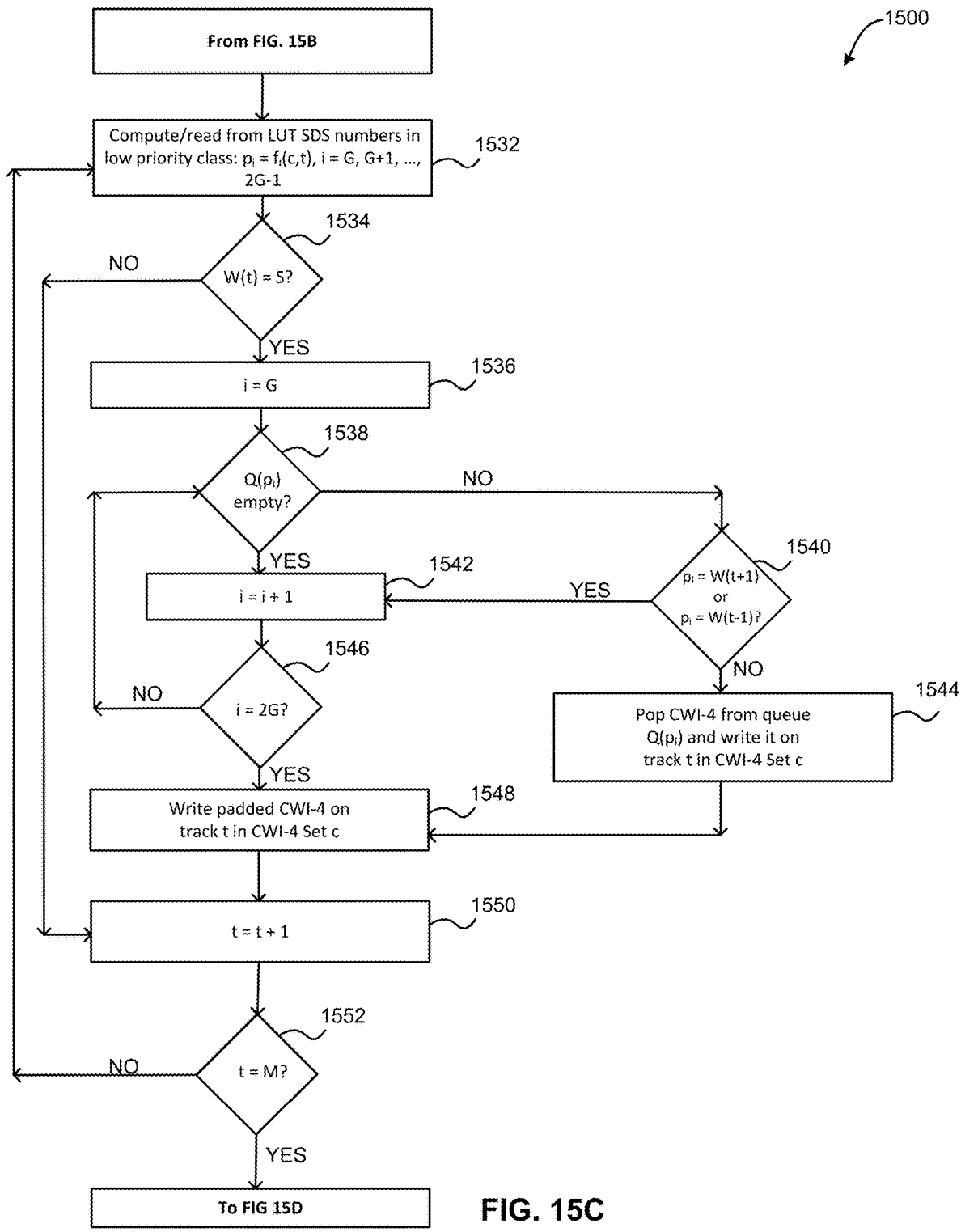
Figure 15D:
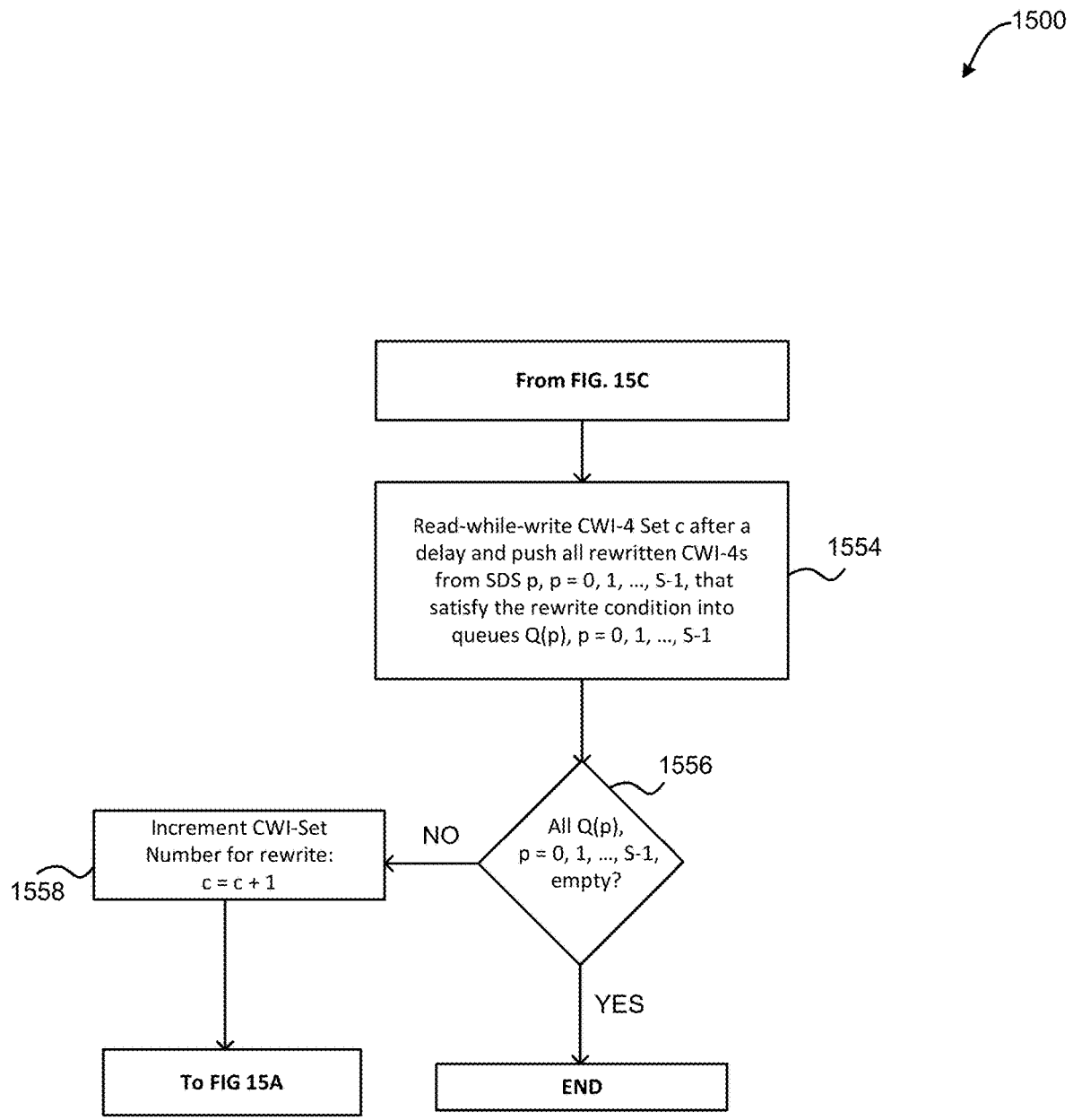

The method 1500 may then proceed with operation 1532 of FIG. 15C, where SDS numbers are computed/read from the LUT in low priority class: $p_i=f_i(c,t)$, i=G, G+1, . . . , 2G−1. Additionally, method 1500 may proceed with decision 1534, where it is determined whether W(t)=S. If it determined in decision 1534 that W(t) does not equal S, then method 1500 may proceed with operation 1550, where t is incremented (t=t+1). However, if it is determined in decision 1534 that W(t)=S, then method 1500 may proceed with operation 1536, where i=G.

Additionally, method 1500 may proceed with decision 1538, where it is determined whether Q($p_i$) is empty. If it is determined in decision 1538 that Q($p_i$) is not empty, then method 1500 may proceed with decision 1540, where it is determined whether $p_i$=W(t+1) or $p_i$=W(t−1). If it is determined in decision 1540 that $p_{i=W(t+}$1) or $p_i$=W(t−1), then method 1500 may proceed with operation 1542, where i is incremented (i=i+1). However, if it is determined in decision 1540 that $p_i$ does not equal W(t+1) or W(t−1), then method 1500 may proceed with operation 1544, where CWI-4 is popped from queue Q($p_i$) and written to track t in CWI-4 Set c.

Further, if it is determined in decision 1538 that Q($p_i$) is empty, then method 1500 may proceed with operation 1542, where i is incremented (i=i+1). Additionally, method 1500 may proceed with decision 1546, where it is determined whether i=2G. If it is determined in decision 1546 that i is not equal to 2G, then the method proceeds with decision 1538. However, if it is determined in decision 1546 that i=2G, then method 1500 may proceed with operation 1548, where a padded CWI-4 is written on track t in CWI-4 Set c.

Further still, method 1500 may proceed with operation 1550, where t is incremented (t=t+1). Also, method 1500 may proceed with decision 1552, where it is determined whether t=M. If it is determined in decision 1552 that t does not equal M, then the method proceed with operation 1532. However, if it is determined in decision 1552 that t=M, then method 1500 may proceed with operation 1554 of FIG. 15D, where a read-while-write is performed on CWI-4 Set c after a delay, and all rewritten CWI-4s from SDS p, p=0, 1, . . . , S−1 that satisfy the rewrite condition are pushed into queues Q(p), p=0, 1, . . . , S−1.

Also, method 1500 may proceed with decision 1556, where it is determined whether all Q(p), p=0, 1, . . . , S−1 is empty. If it is determined in decision 1556 that all Q(p), p=0, 1, . . . , S−1 is not empty, then method 1500 may proceed with operation 1558, where a CWI-Set Number is incremented for rewrite: c=c+1. Additionally, the method then proceeds with operation 1508 of FIG. 15A. However, if it is determined in decision 1556 that all Q(p), p=0, 1, . . . , S−1 are empty, then the method stops.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying code word interleaved (CWI)-4 entries to be re-written to a data storage cartridge;
   selecting a subset of the CWI-4 entries to be included within a first CWI-4 set, where a plurality of the CWI-4 entries within the subset are associated with a single sub data set (SDS), and for each location within the first CWI-4 set, each SDS within a predetermined subset of SDSs from which a CWI-4 entry is selected is associated with a priority according to a predetermined re-write table; and
   re-writing the first CWI-4 set to the data storage cartridge.

2. The computer-implemented method of claim 1, wherein each CWI-4 entry includes four C1 codewords, byte interleaved.

3. The computer-implemented method of claim 1, wherein each CWI-4 entry is created utilizing data from a single SDS.

4. The computer-implemented method of claim 1, wherein a CWI-4 set includes a plurality of CWI-4 entries that are simultaneously written to a data storage cartridge, utilizing a write head of a data storage drive.

5. The computer-implemented method of claim 1, wherein each CWI-4 entry within the first CWI-4 set is selected from one of four predetermined SDSs, which enables up to two CWI-4 entries from a same SDS to be included within the first CWI-4 set.

6. The computer-implemented method of claim 1, wherein each CWI-4 entry within the first CWI-4 set is selected from one of eight predetermined SDSs, which enables up to four CWI-4 entries from a same SDS to be included within the first CWI-4 set.

7. The computer-implemented method of claim 1, wherein neighboring locations within the first CWI-4 set are prevented from having CWI-4 entries from a same SDS.

8. The computer-implemented method of claim 1, wherein a minimum of two CWI-4 sets are re-written to the data storage cartridge.

9. The computer-implemented method of claim 1, wherein the first CWI-4 set is appended to CWI-4 sets previously written to the data storage cartridge during an initial write operation.

10. The computer-implemented method of claim 1, wherein CWI-4 entries are included within the first CWI-4 set according to a predetermined re-write table, where:
    each CWI-4 entry within the first CWI-4 set is selected from a predetermined subset of available SDSs, and
    for each location within the first CWI-4 set, the predetermined subset of SDSs from which the CWI-4 entry is selected are indicated by the predetermined re-write table.

11. The computer-implemented method of claim 10, wherein the predetermined re-write table is implemented in hardware of a data storage drive.

12. The computer-implemented method of claim 10, wherein the predetermined re-write table is implemented in updateable firmware of a data storage drive.

13. The computer-implemented method of claim 1, wherein a first half of the predetermined subset of SDSs are associated with a first priority, and a second half of the predetermined subset of SDSs are associated with a second priority.

14. The computer-implemented method of claim 13, wherein for each location within the first CWI-4 set, if no CWI-4 entries are available for re-write from the predetermined subset of SDSs having the first priority, a CWI-4 entry is selected from the predetermined subset of SDSs having the second priority.

15. The computer-implemented method of claim 13, wherein a predetermined first-priority subset of SDSs for a single location within the first CWI-4 set is divided into two predetermined subsets of SDSs that are included in predetermined second-priority subsets for two adjacent locations of the single location within the first CWI-4 set.

16. A computer program product for implementing prioritized sourcing for efficient rewriting, the computer program product comprising a computer readable storage medium having program instructions embodied therewith, wherein the computer readable storage medium is not a transitory signal per se, the program instructions executable by a processor to cause the processor to perform a method comprising:
    identifying code word interleaved (CWI)-4 entries to be re-written to a data storage cartridge, utilizing the processor;
    selecting a subset of the CWI-4 entries to be included within a first CWI-4 set, utilizing the processor, where a plurality of the CWI-4 entries within the subset are associated with a single sub data set (SDS), and for each location within the first CWI-4 set, each SDS within a predetermined subset of SDSs from which a CWI-4 entry is selected is associated with a priority according to a predetermined re-write table; and
    re-writing the first CWI-4 set to the data storage cartridge, utilizing the processor.

17. The computer program product of claim 16, wherein each CWI-4 entry includes four C1 codewords, byte interleaved.

18. The computer program product of claim 16, wherein each CWI-4 entry is created utilizing data from a single SDS.

19. A data storage drive, comprising:
a processor; and
logic integrated with the processor, executable by the processor, or integrated with and executable by the processor, the logic being configured to:
identify code word interleaved (CWI)-4 entries to be re-written to a data storage cartridge;
select a subset of the CWI-4 entries to be included within a first CWI-4 set, where a plurality of the CWI-4 entries within the subset are associated with a single sub data set (SDS), and for each location within the first CWI-4 set, each SDS within a predetermined subset of SDSs from which a CWI-4 entry is selected is associated with a priority according to a predetermined re-write table; and
re-write the first CWI-4 set to the data storage cartridge.

* * * * *